Dec. 15, 1959  C. A. NERACHER ET AL  2,916,936
POWER TRANSMISSION
Filed Jan. 16, 1941  13 Sheets-Sheet 1
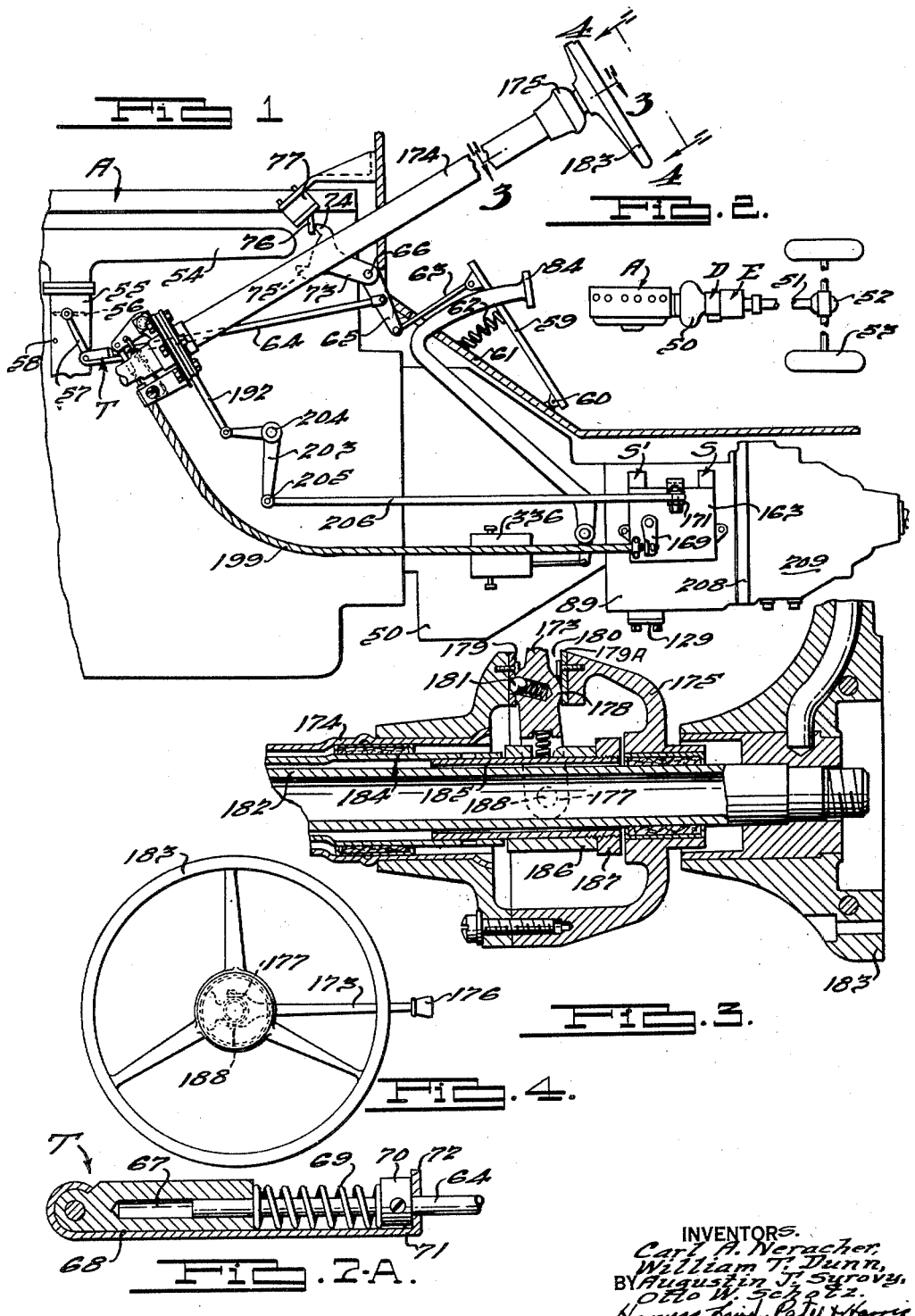
INVENTORS.
Carl A. Neracher,
William T. Dunn,
BY Augustin J. Syrovy,
Otto W. Schotz.
Harness, Dickey, Pierce & Harris
ATTORNEYS.

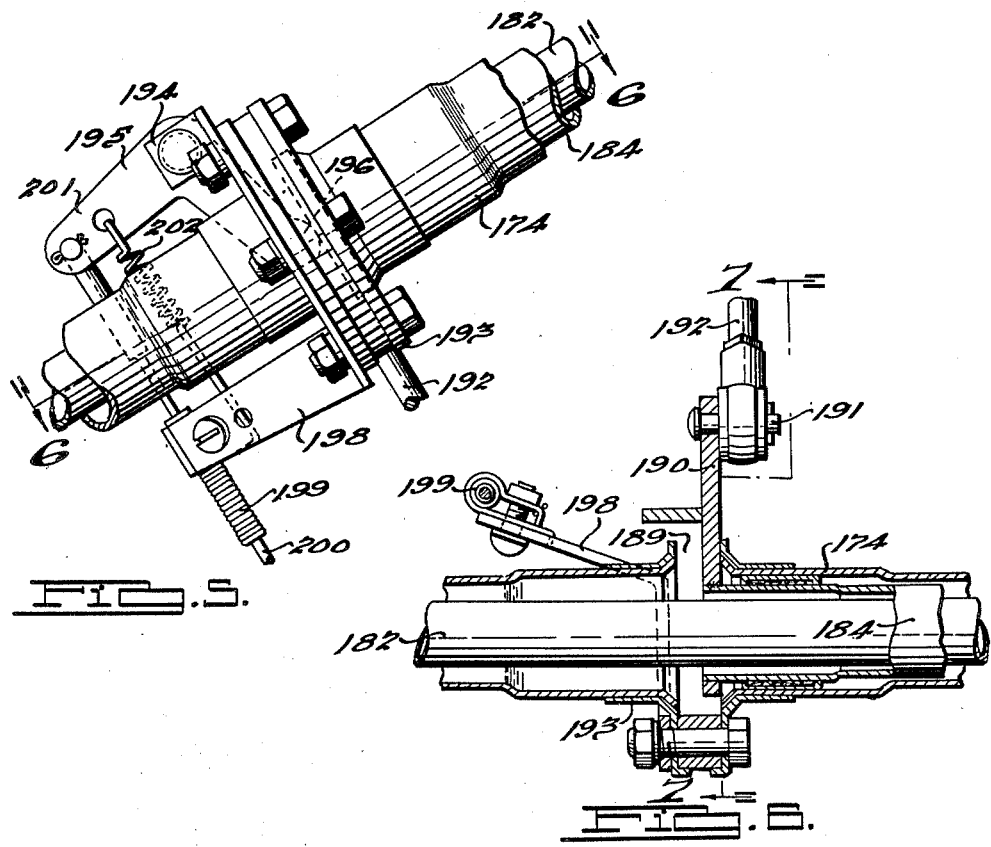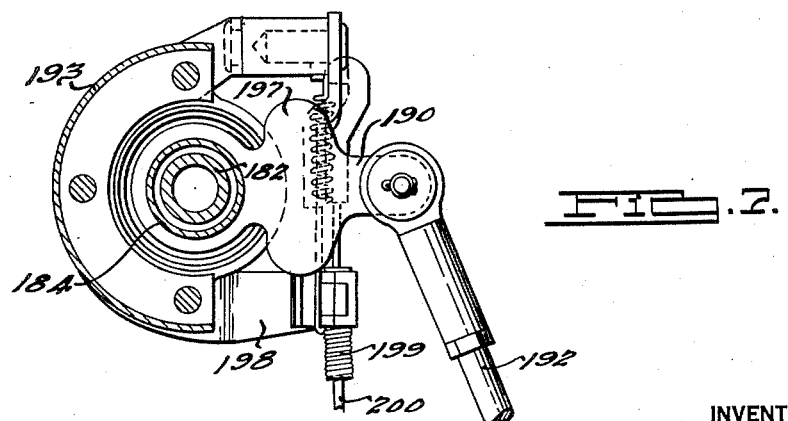

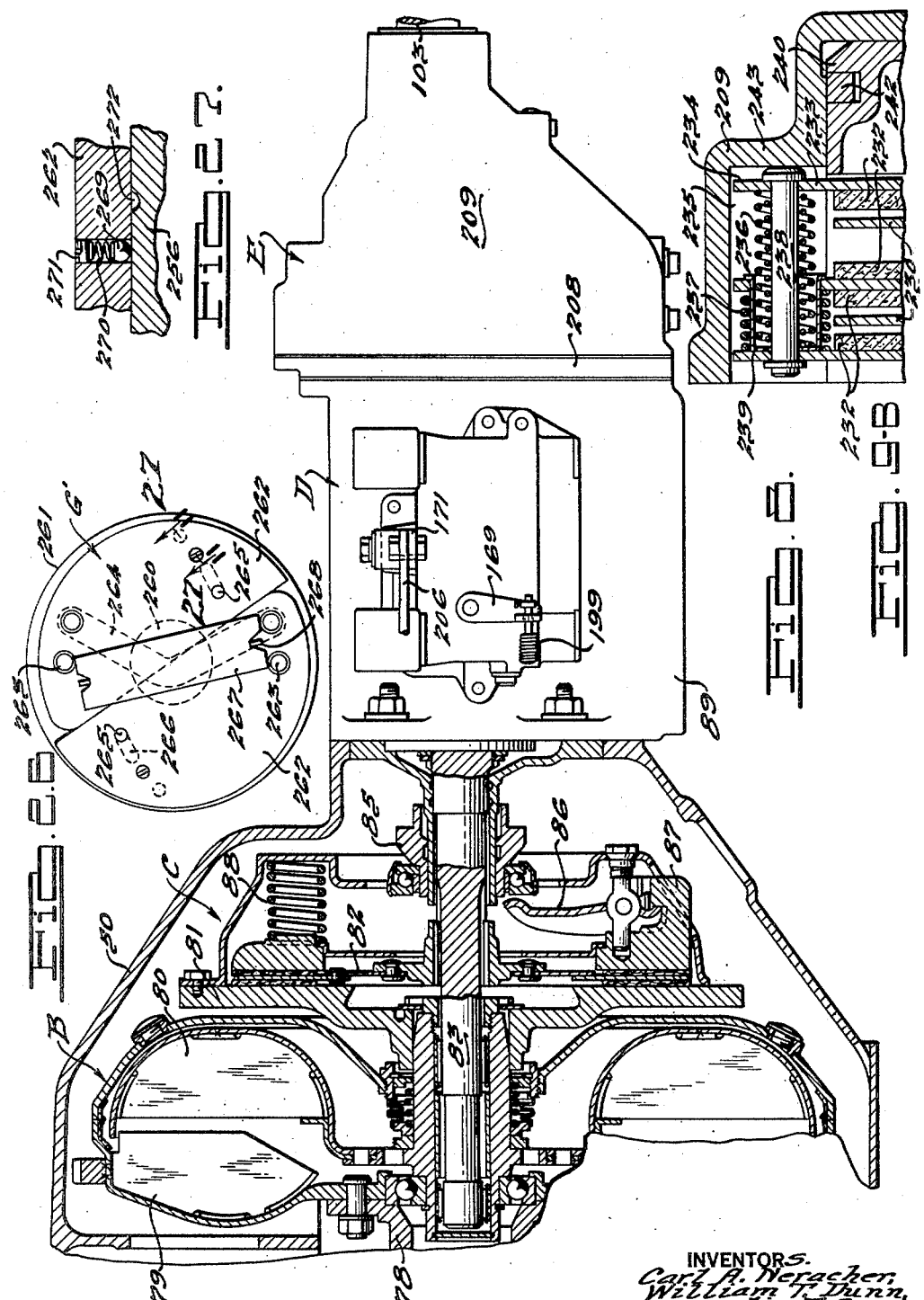

Dec. 15, 1959   C. A. NERACHER ET AL   2,916,936
POWER TRANSMISSION
Filed Jan. 16, 1941   13 Sheets-Sheet 4
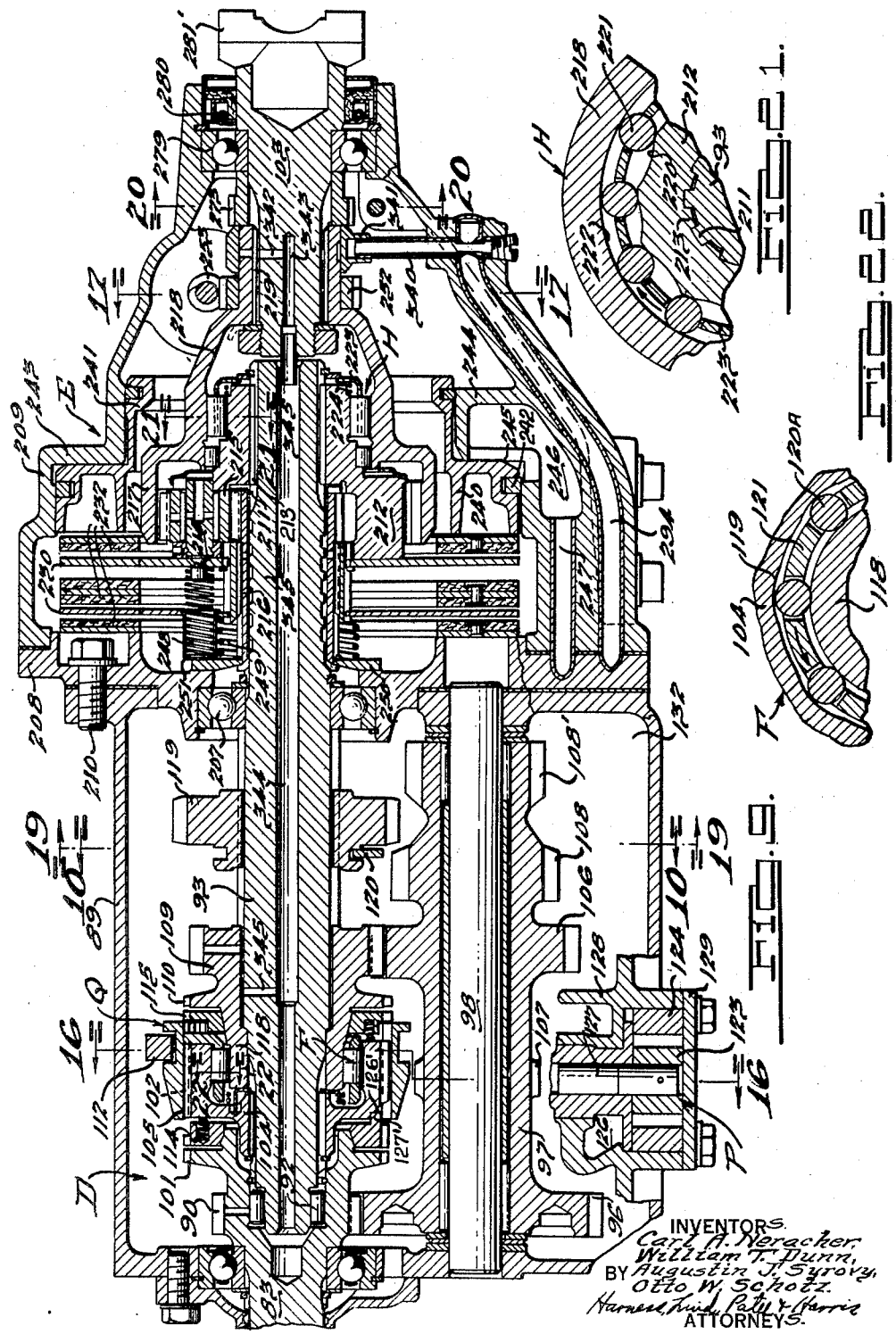
INVENTORS.
Carl A. Neracher,
William T. Dunn,
BY Augustin J. Syrovy,
Otto W. Schotz
Harness, Dickey, Pierce & Harris
ATTORNEYS.

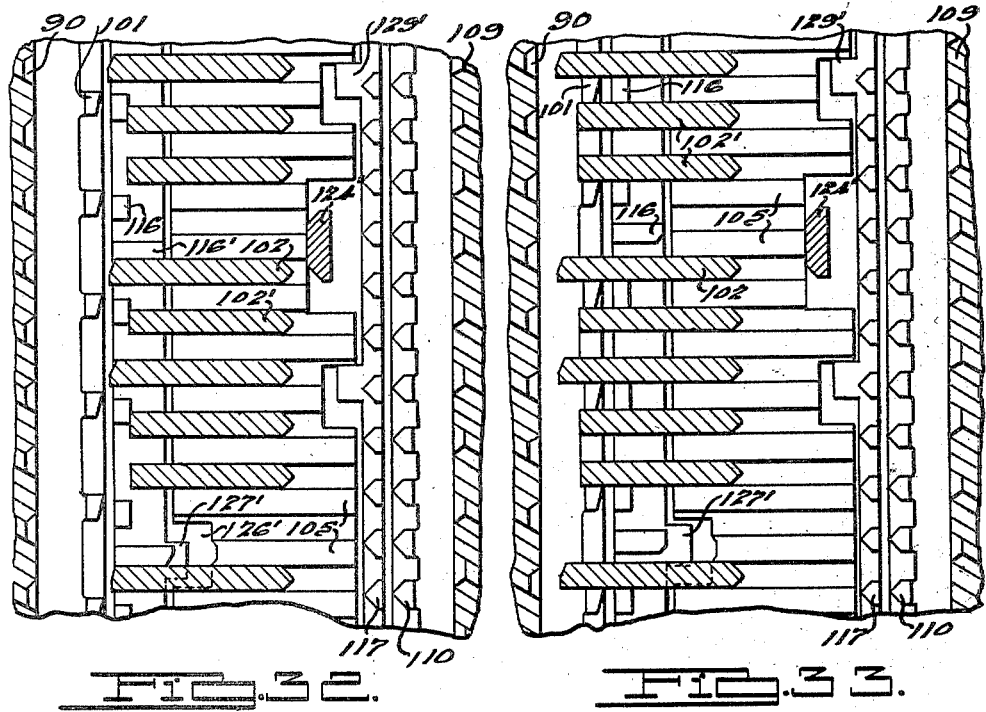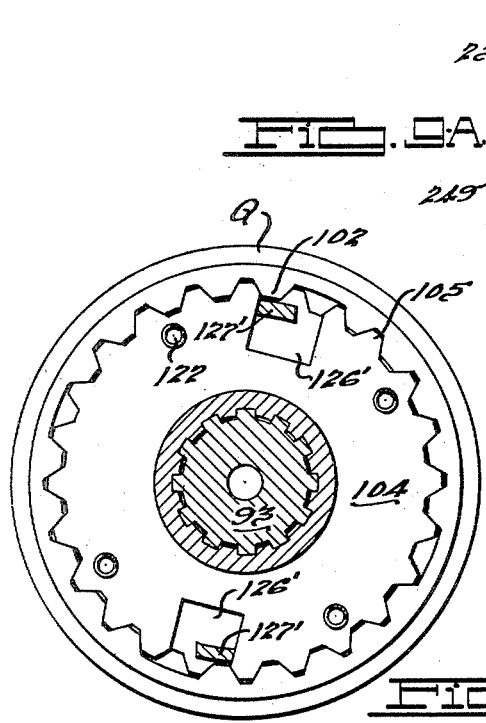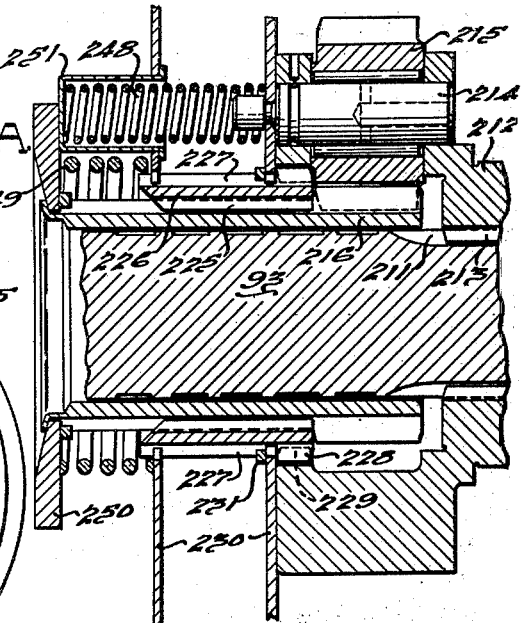

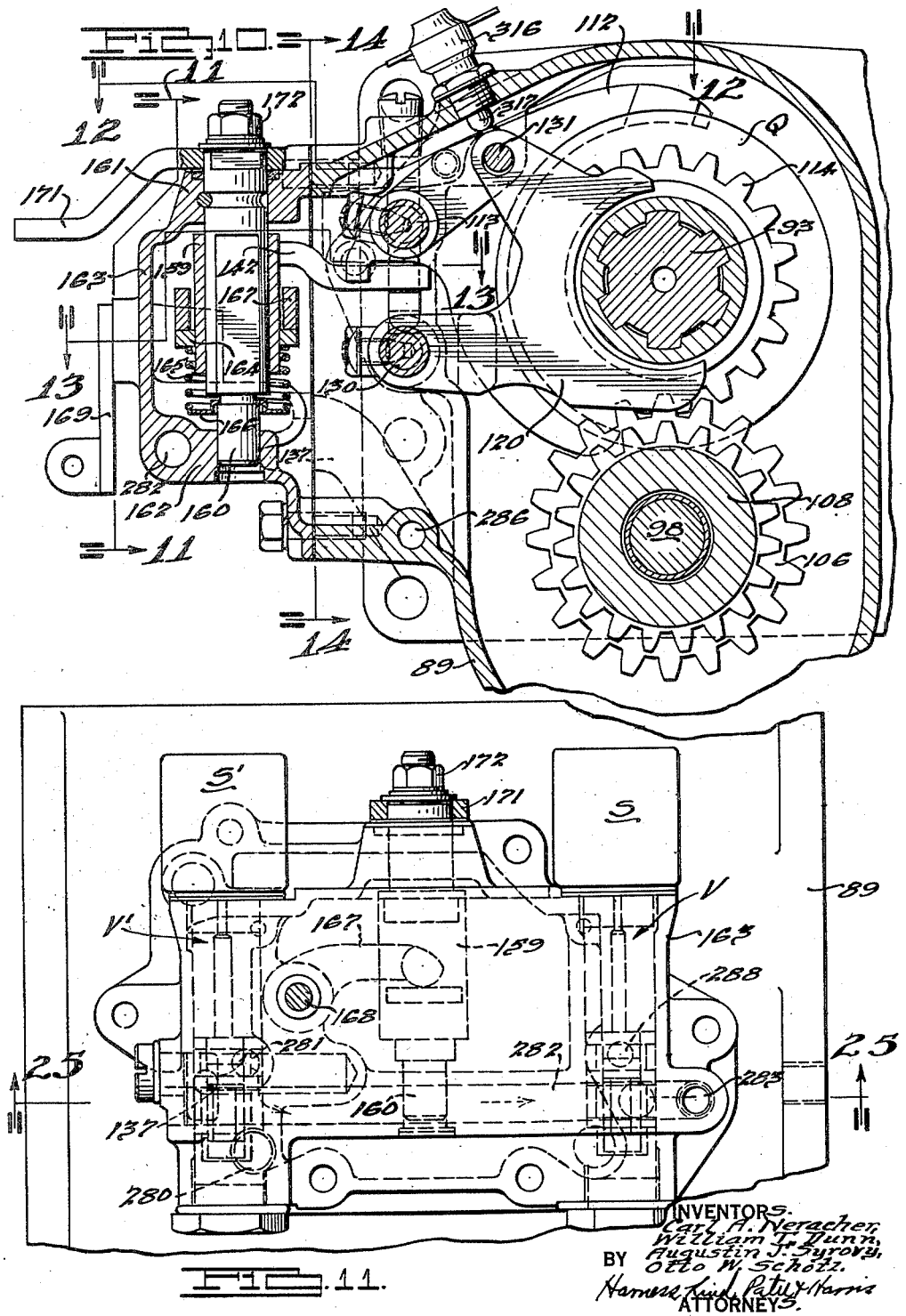

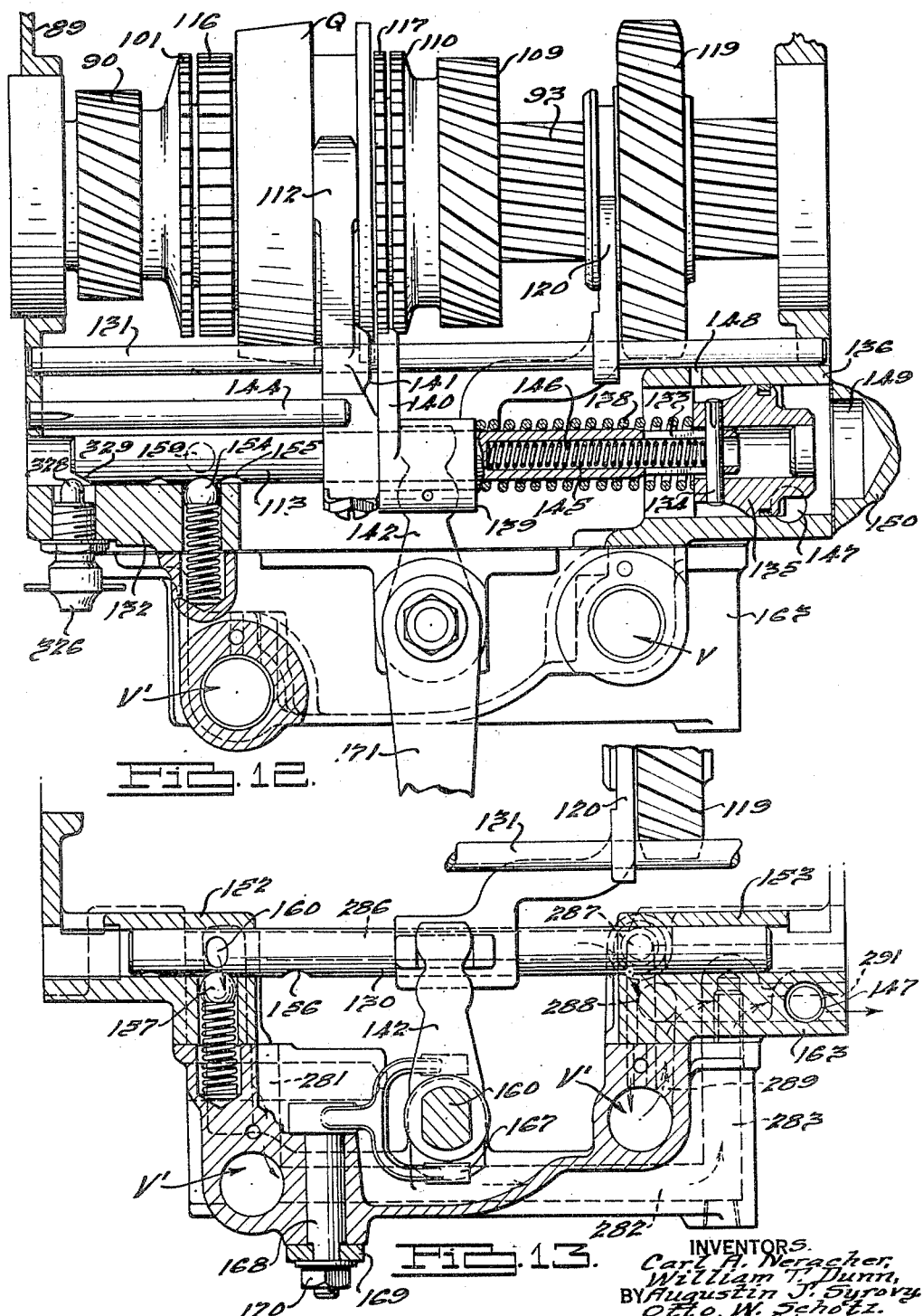

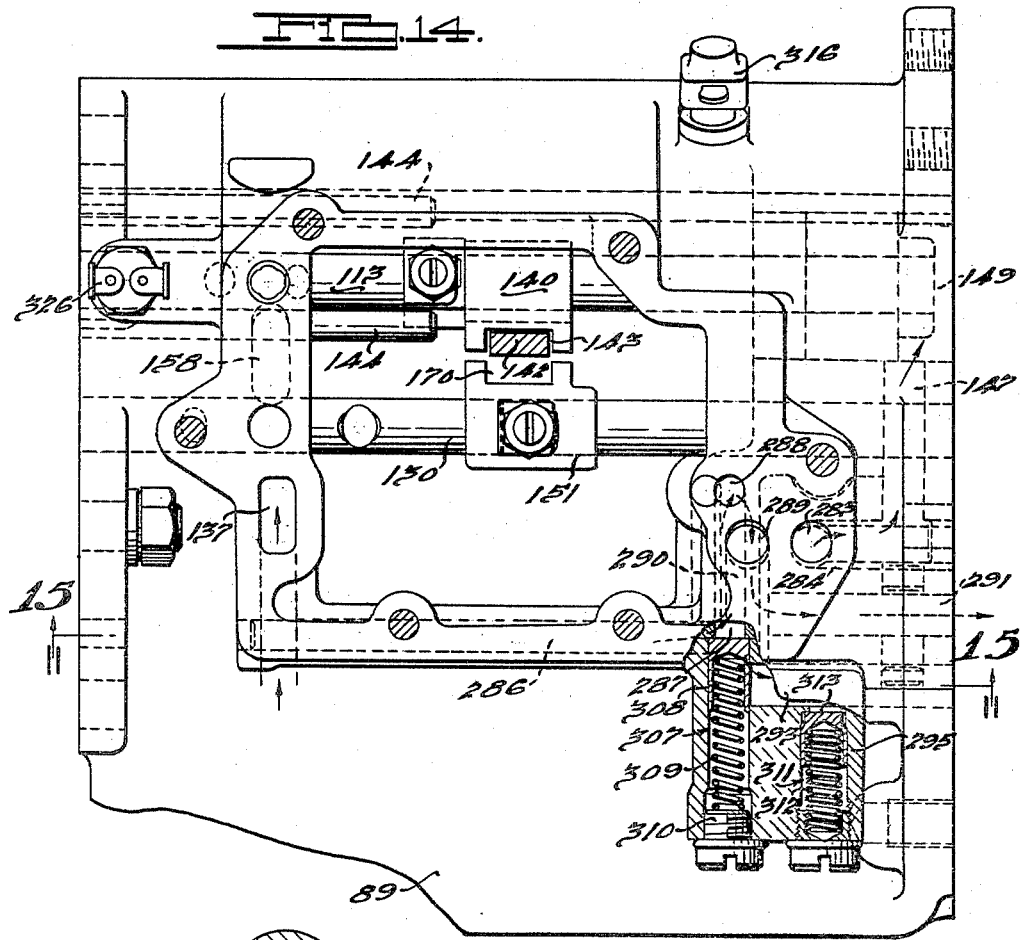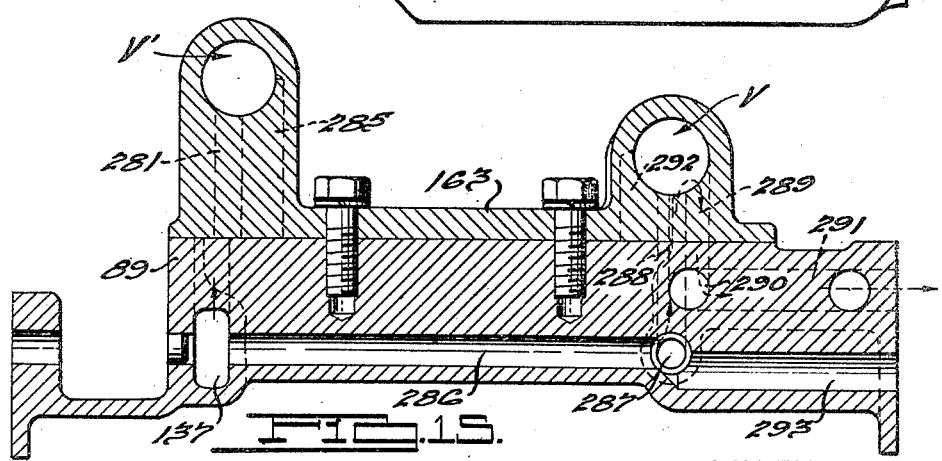

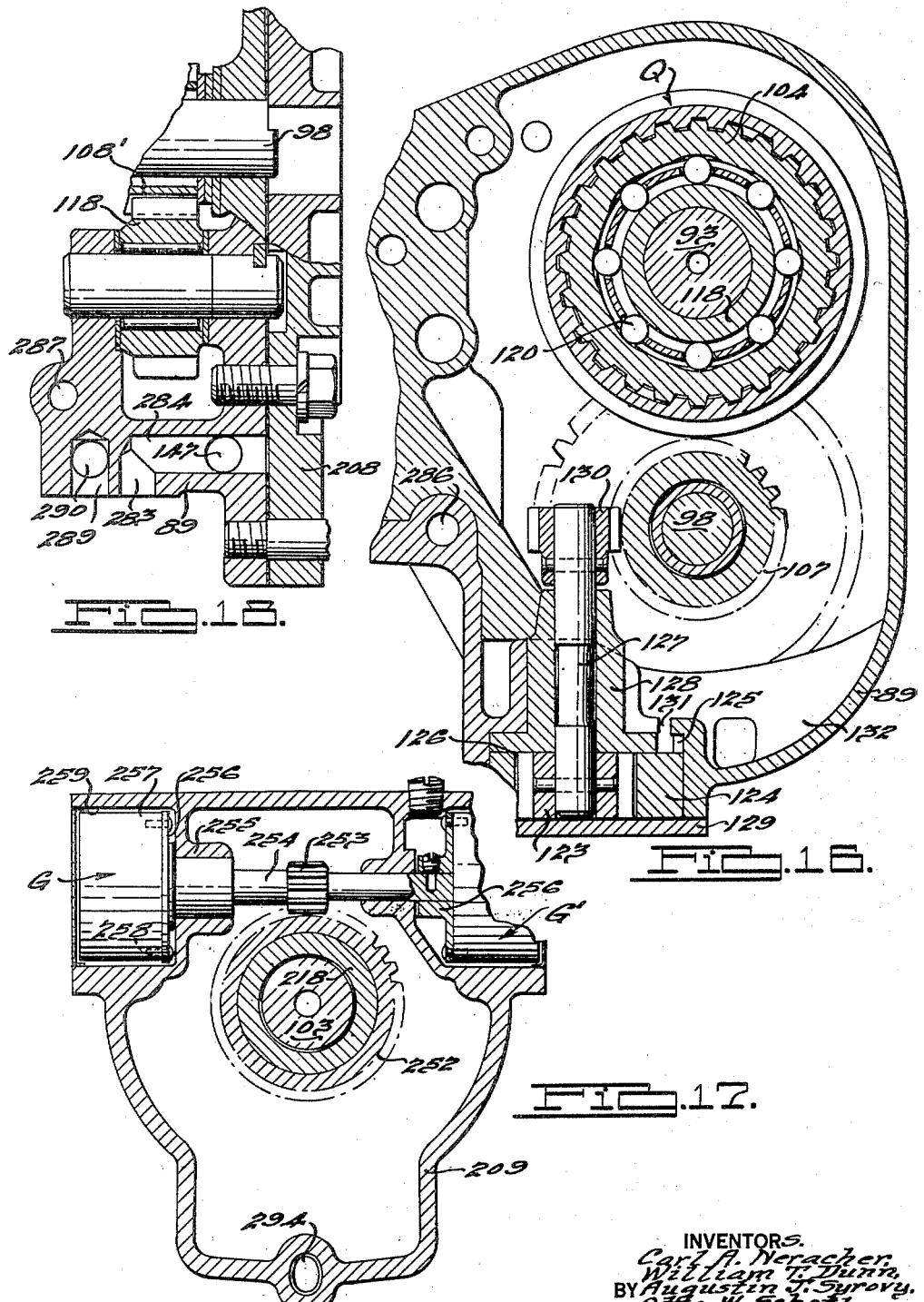

Dec. 15, 1959 C. A. NERACHER ET AL 2,916,936
POWER TRANSMISSION
Filed Jan. 16, 1941 13 Sheets-Sheet 10

INVENTORS.
Carl A. Neracher,
William T. Dunn,
BY Augustin J. Surovy,
Otto W. Schotz.
Harness, Dickey, Pierce & Harris
ATTORNEYS.

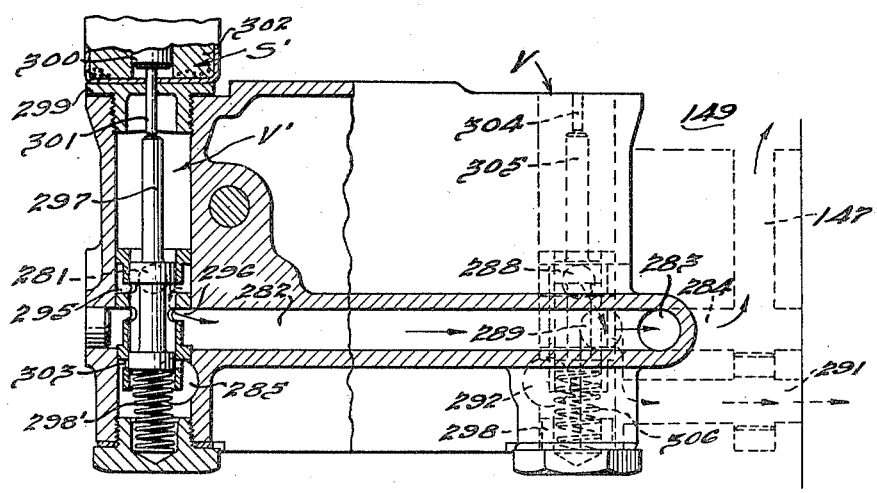
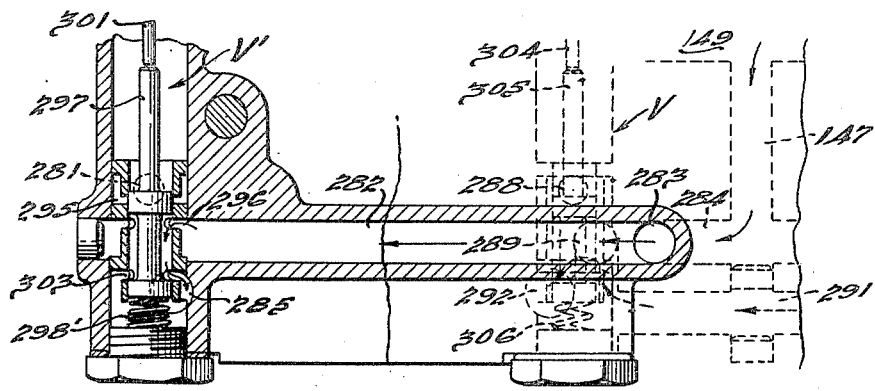
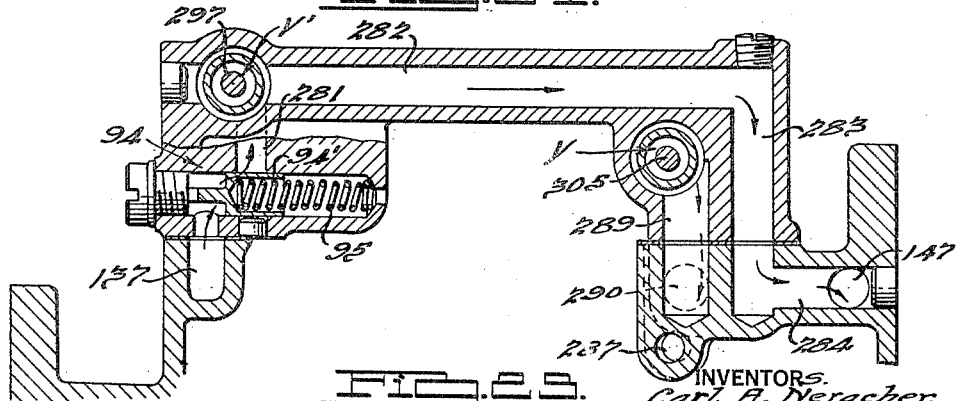

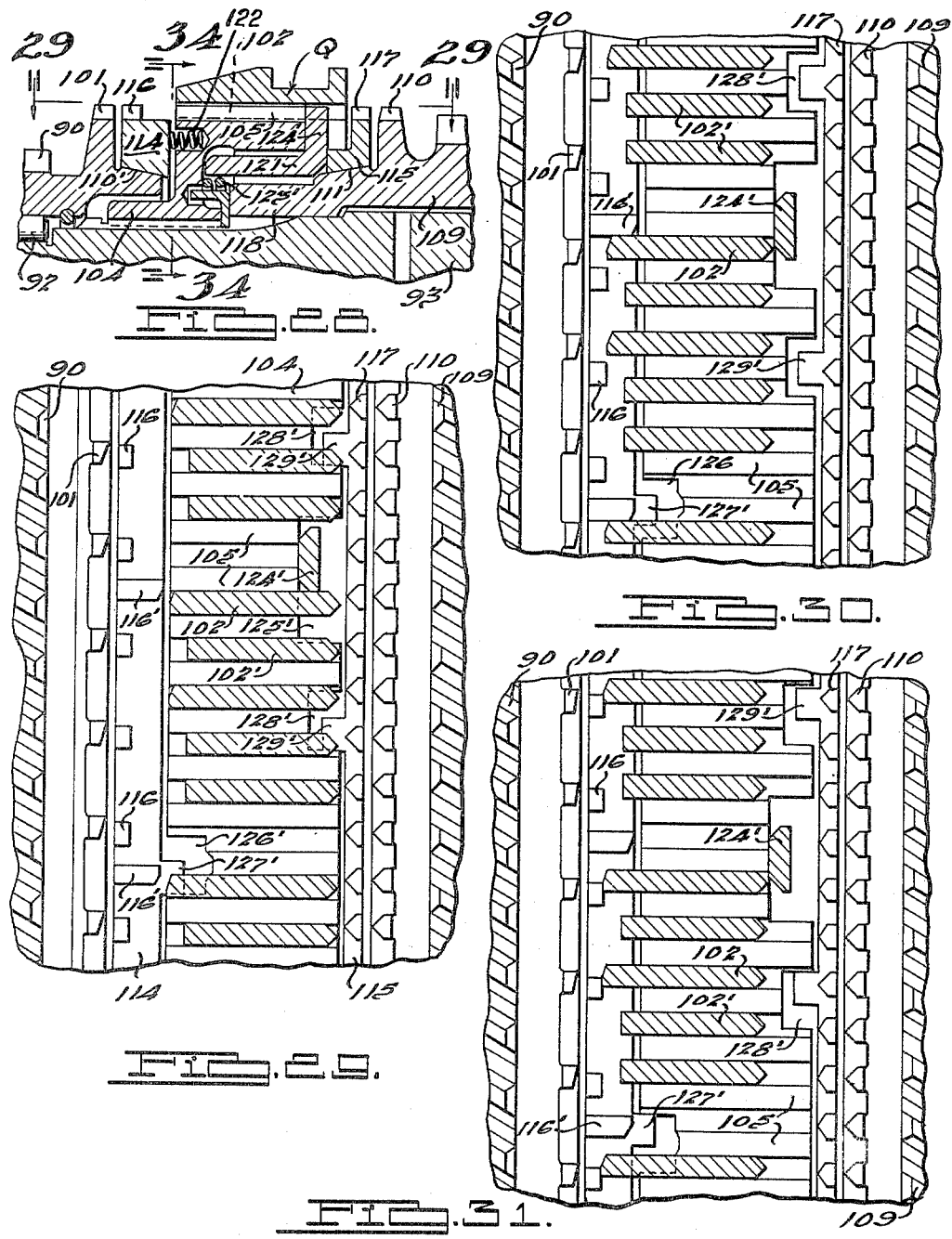

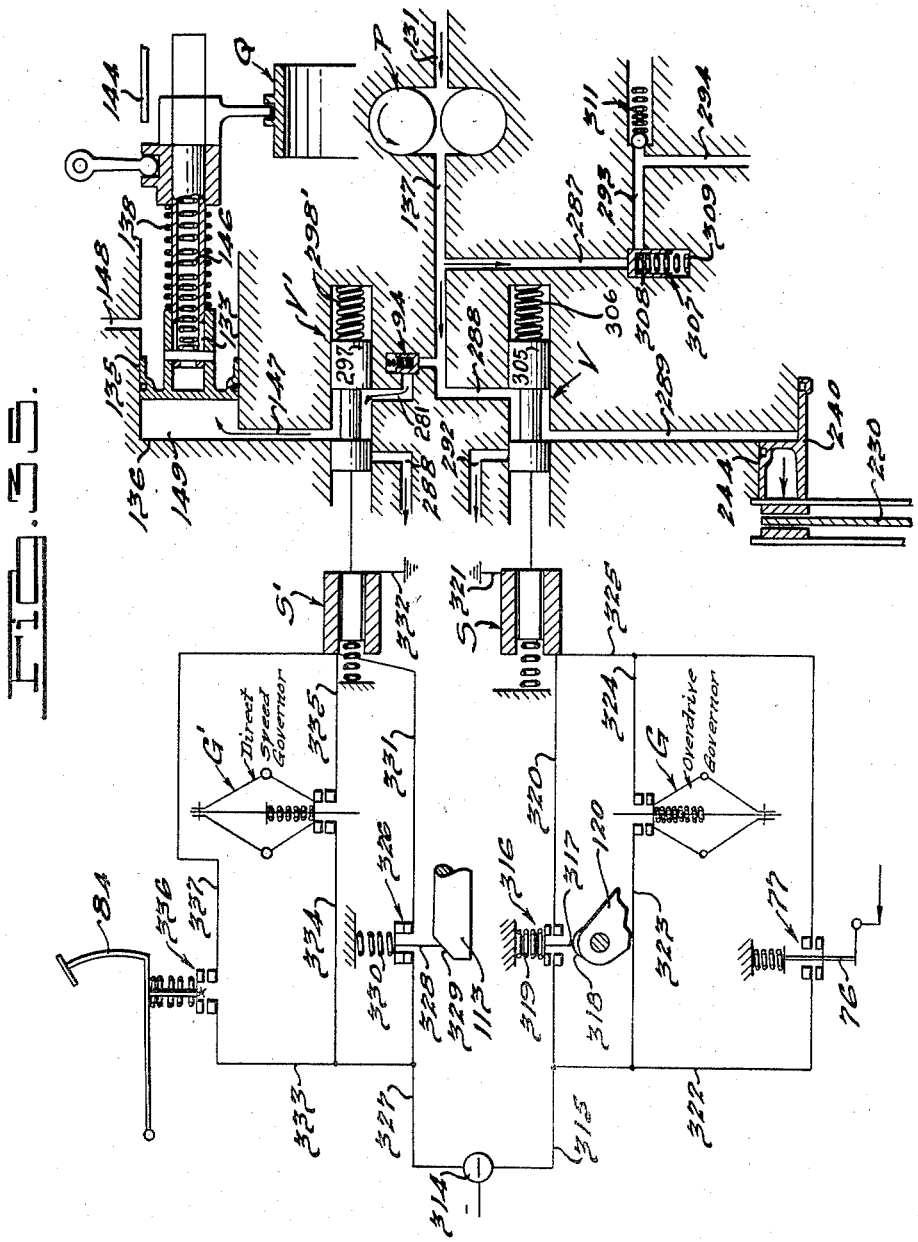

United States Patent Office

2,916,936
Patented Dec. 15, 1959

2,916,936

POWER TRANSMISSION

Carl A. Neracher, William T. Dunn, Augustin J. Syrovy, and Otto W. Schotz, Detroit, Mich., assignors to Chrysler Corporation, Highland Park, Mich., a corporation of Delaware Application January 16, 1941, Serial No. 374,674

76 Claims. (Cl. 74—472)

This invention relates to power transmissions and refers more particularly to improved driving systems for motor vehicles.

It is an object of our invention to provide a transmission system affording improved characteristics of change speed control with a comparatively simple mechanism capable of long life.

Another object of our invention is to provide a transmission affording improved means for changing speed ratios through the medium of positively engaging clutch means having synchronous control for insuring clutching without shock or ratcheting noise.

A further object is to provide an improved system of vehicle drive incorporating both manual and automatic change speed control affording improved vehicle driving functions.

A still further object is to provide an improved pressure lubrication system that is contained entirely within the transmission casing.

A still further object is to provide a transmission affording improved means for changing speed ratios through the medium of two positively engaging clutches, one being a friction clutch and the other a toothed clutch. These clutches are operatively related with a pair of gearsets and control means is provided whereby an automatic step-up in driving ratio may be obtained from a low ratio to an intermediate ratio and then to a higher ratio, one of the speed changes taking place during driving and the other taking place upon momentary release of the drive.

Our improved transmission is preferably arranged so that two changes in speed ratio may be obtained automatically in forward drive, thus providing a driving arrangement which does not differ from that in conventional use in its general functions. Both of the speed ratio changes are obtained automatically, one upon the vehicle reaching a predetermined speed, and the other upon release of the accelerator pedal when the vehicle is traveling above a predetermined speed higher than that necessary for the said one shift to take place.

The mechanism is further arranged so that a shift down to a lower speed ratio, for faster acceleration, hill climbing, etc., while the vehicle is traveling above the aforesaid higher predetermined speed may be quickly and smoothly accomplished by depression of the vehicle accelerator pedal to the full extent of its travel, or by other equivalent control means.

It is therefore a further object to provide an improved speed change mechanism wherein one step-up in the driving ratio may be obtained instantaneously upon the attainment of a predetermined vehicle speed, and a second step-up in the driving ratio may be obtained upon momentary release of the driving torque when the vehicle is traveling at a speed in excess of a predetermined speed higher than that at which the first step-up is obtained.

A still further object is to provide a transmission of the aforesaid type wherein an instantaneous "kickdown" to a lower speed ratio from either of two higher speed ratios may be obtained.

A still further object is to provide in a transmission of this type means for obtaining "kickdown" to a lower speed ratio from a higher speed ratio without the necessity of interrupting the drive of the engine.

We have provided an improved drive system incorporating a fluid coupling and kickdown transmission so constructed as to provide great flexibility of car control with very little effort such that nearly all driving may be done without manipulation of clutch pedals or gear shift levers and at the same time affording flexibility of car control best suited to the changing requirements of torque multiplication and other power transmitting characteristics. Our driving mechanism affords improved quietness and smoothness of car operation and facilitates manipulation of the car especially under heavy traffic conditions.

With our transmission it is practicable for the driver to stay in a selected speed ratio setting while stopping, and thereafter obtain rapid car starting accelerations under favorable torque multiplication, and faster ratio boulevard or country drive conditions without operating clutch pedal or gear shift lever.

According to the present embodiment of our invention, we have provided a transmission employing countershaft and planetary gearing and providing four forward speeds and reverse. Manual selection of the countershaft gearing may be made to emergency low, free wheeling second and non-free wheeling second, in each of which an automatic shift in the planetary gearing occurs to a faster drive ratio and back to the selected range, the automatic shifting being effected by natural functional manipulation of the accelerator pedal.

Additional features of our invention are found in the provision of a simplified remote shift mechanism for the manual control and many features of construction and functional operation which will be more apparent from the following illustrative embodiments of the principles of our invention, reference being had to the accompanying drawings, in which:

Fig. 1 is a side elevational view of the power plant and transmission for a motor vehicle.

Fig. 2 is a plan view somewhat diagrammatically illustrating the power transmission assembly in relation to the vehicle driving ground wheels.

Fig. 3 is a sectional view of the remote control hand shift mechanism taken as indicated by line 3—3 of Fig. 1.

Fig. 4 is a top plane view of the Fig. 3 mechanism taken as indicated by line 4—4 of Fig. 1.

Fig. 5 is an enlarged view of a portion of the Fig. 1 shift apparatus.

Fig. 6 is a detail sectional view taken as indicated by line 6—6 of Fig. 5.

Fig. 7 is a detail sectional view taken as indicated by line 7—7 of Fig. 6.

Fig. 7A is a detail sectional elevational view of a portion of the engine throttle operating mechanism shown in Fig. 1.

Fig. 8 is an enlarged side view partly in section and partly in elevation showing the Fig. 1 power transmission.

Fig. 9 is a sectional elevational view through the speed ratio changing transmission which is illustrated in elevation in Fig. 8.

Fig. 9A is an enlarged sectional detail of the sun gear clutch of Fig. 9.

Fig. 9B is an enlarged detail of the sun gear brake anchorage structure of Fig. 9.

Fig. 10 is a transverse sectional view looking forwardly as indicated by line 10—10 of Fig. 9, showing the transmission portion of the remote shift mechanism.

Fig. 11 is a detail elevational view taken as indicated by line 11—11 of Fig. 10, certain of the oil pressure lines being shown in dotted lines.

Fig. 12 is a plan view taken as indicated by line 12—12 of Fig. 10, certain parts being broken away to show sectional details thereof.

Fig. 13 is a detail sectional view taken as indicated by line 13—13 of Fig. 10.

Fig. 14 is a detail elevational view taken as indicated by line 14—14 of Fig. 10, certain parts being broken away to show sectional details thereof.

Fig. 15 is a detail sectional view taken as indicated by line 15—15 of Fig. 14.

Fig. 16 is a detail sectional view taken as indicated by the line 16—16 of Fig. 9.

Fig. 17 is a detail sectional view taken as indicated by the line 17—17 of Fig. 9.

Fig. 18 is a detail sectional view taken as indicated by the line 18—18 of Fig. 19.

Fig. 21 is an enlarged sectional view taken as indicated by the line 21—21 of Fig. 9.

Fig. 22 is an enlarged sectional view taken as indicated by the line 22—22 of Fig. 9.

Fig. 23 is an enlarged sectional view of a portion of the transmission case cover with parts broken away to show details of the hydraulic system.

Fig. 24 is a view similar to Fig. 23, but with the valve member thereof in a different operative position.

Fig. 25 is a sectional view taken as indicated by the line 25—25 of Fig. 11.

Fig. 26 is an end view of one of the governors shown in Fig. 11 with the cover removed.

Fig. 27 is an enlarged sectional detail view taken as indicated by the line 27—27 of Fig. 26.

Fig. 28 is an enlarged retail sectional view of the synchronous blocker clutch and free wheeling control mechanism.

Fig. 29 is a sectional plan view of the clutch teeth taken as indicated by the line 29—29 of Fig. 28 showing the clutch sleeve in neutral position.

Fig. 30 is a view similar to Fig. 29 showing the clutch sleeve in free wheeling second speed ratio position.

Fig. 31 is a similar view showing the clutch sleeve in coast block position.

Fig. 32 is a similar view showing the clutch sleeve in drive block position.

Fig. 33 is a similar view showing the clutch sleeve in one of its engaged positions.

Fig. 34 is a sectional view taken as indicated by the line 34—34 of Fig. 28.

Fig. 35 is a diagrammatic view of the transmission control system.

Figure 19:
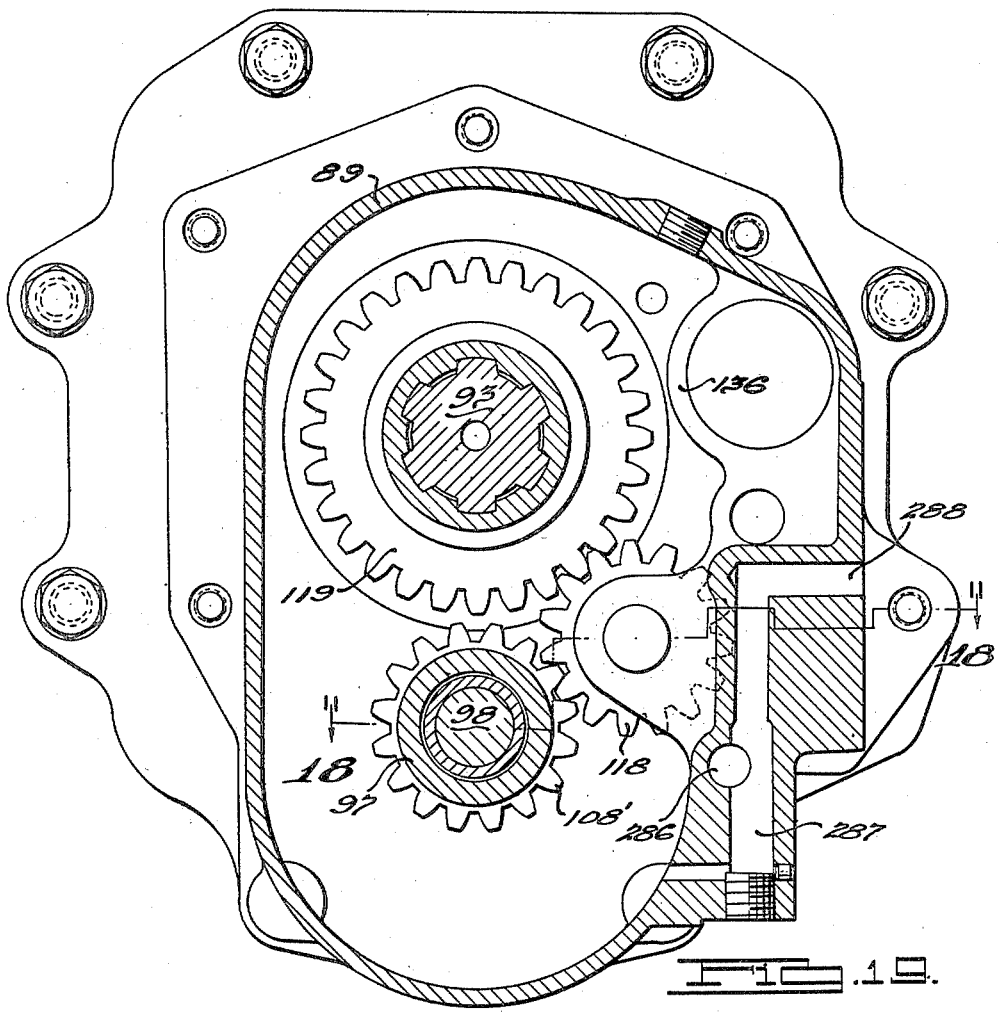
Fig. 19 is a detail sectional view taken as indicated by the line 19—19 of Fig. 9, looking rearwardly of the transmission.

We have illustrated the principles of our invention in connection with a motor vehicle drive wherein the usual engine A transmits its drive through clutching means B, C, within casing 50, the drive then passing through the underdrive transmission D, overdrive transmission E and propeller shaft 51 (Fig. 2) to the differential 52 and thence to the vehicle ground wheels 53 where it is desired to drive the rear wheels according to present day practice.

By preference, the arrangement is such that the drive from the engine passes through an underdrive unit, then through an overdrive unit so that when both units are operating in highest ratio the car is driven in an overdrive ratio between the engine A and wheels 53. Our arrangement provides such conveniently operable kickdown or shift to a reduction drive from direct that the aforesaid arrangement is practicable thereby obtaining advantages of economy, long life and quietness of operation without the disadvantages of sluggish operation which is especially objectionable in city driving.

The engine A has the customary intake manifold 54 and the carburetor riser 55 containing a throttle valve 56 operable by a lever 57 throughout a range between the illustrated closed throttle position for engine idling and a wide open position limited by lever 57 engaging a stop 58. Lever 57 is adjusted by a driver operable accelerator pedal 59 pivotally mounted at 60 on the toeboard 61 to swing downwardly against restoring spring 62 to thrust through the system of pivotally jointed links 63, 64 and connecting lever 65, the latter being pivotally supported at 66.

The link 64 operates lever 57 through a lost motion device T (Fig. 7A) serving to normally connect these parts as a solid member but affording thrust of link 64 forwardly after lever 57 has engaged its limiting stop 58 to effect the kickdown control on the transmission. Thus, link 64 has its forward end slidable in bore 67 of finger 68 which is pivoted to the lower end of lever 57. A spring 69 acts between finger 68 and a collar 70 fast on link 64 and yields only when link 64 is thrust forwardly after lever 57 has engaged stop 58, the spring otherwise transmitting thrust of link 64 to finger 68 without lost motion. A bracket 71 limits separation between the link 64 and finger 68 and closes the throttle valve 56 when the accelerator pedal is released for upward swing by spring 62.

The throttle operating mechanism therefore is such that movement of pedal 59 throughout its normal range will cause a corresponding adjustment in the valve 56 between its limits of fully closed and wide open positions. When the pedal has been depressed to the wide open throttle position, lever 57 engages stop 58 and further depression of the pedal in its kickdown range of movement for the kickdown transmission control is accommodated by yielding of spring 69 while the throttle valve remains fully open. On release of the accelerator pedal, springs 69 and 62 both act until collar 70 engages the rear flange 72 of bracket 71 and thereafter, throughout the normal range of throttle adjustment, spring 62 alone serves to restore pedal 59 and close the throttle valve.

The kickdown range of accelerator pedal movement is utilized to effect release of the reaction gear of the overdrive unit for a quick change from overdrive to direct drive without necessity of engine ignition interruption. The throttle being open will cause the engine to rapidly speed up as soon as the lower driving ratio becomes effective.

While in the present embodiment of the invention, overtravel of the throttle adjusting mechanism for obtaining kickdown is used, it is obvious that such overtravel is not absolutely necessary, and lost motion mechanism F could be omitted without materially affecting the operation of the device. If mechanism T is omitted, the kickdown control switch is arranged to be closed at wide open throttle position of the lever 57 or just prior to the time said lever reaches that position. Inasmuch as the last increment of movement of the throttle valve has very little effect upon engine performance, practically identical operating characteristics will be obtained without the lost motion mechanism T as with it.

The lever 65 has fastened thereto a second lever 73 directed forwardly to provide spaced fingers 74, 75 in the path of the actuator 76 of the snap-switch 77 which is a control part of the kickdown mechanism. When pedal 59 moves in its kickdown range, finger 75 throws actuator 76 rearwardly to close switch 77, the switch remaining closed until the pedal 59 is fully released, or substantially so, at which time finger 74 restores actuator 76 to the Fig. 1 position to open the switch 77.

We preferably transmit the drive from the engine A to underdrive transmission D through clutch means comprising a fluid coupling B of the kinetic type preferably in conjunction with a releasable clutch C of a conventional design employed to facilitate manual shifts in transmission D, and to accommodate stopping the car in gear without tendency of the coupling B to cause the car to creep especially where the idle is set "fast" (as during winter starting), or where the throttle is accidentally opened.

The engine crankshaft 78 drives the coupling impeller 79 to circulate the fluid in its vaned passages to drive the vaned runner 80 in a manner well known for fluid couplings of the type illustrated. The runner 80 drives the clutch member 81 of the friction clutch C of commercial design. Driven clutch disc 82 is fixed to intermediate drive shaft 83 and is drivingly disengaged by depressing a clutch pedal 84 (Fig. 1) which slides the throwout member 85 forwardly to operate levers 86 to unload driving pressure plate 87, springs 88 loading this plate and engaging the clutch when pedal 84 is released.

Shaft 83 extends rearwardly into the housing 89 of underdrive unit D (Fig. 9) where it is formed with a main drive pinion 90 and a set of external driving teeth 101 which are adapted to slidably engage internal clutch teeth 102 of the synchronous coupling clutch sleeve Q (Fig. 29). Fixed to the shaft 93 is a hub 104 formed with external teeth 105 slidably engaged with the internal teeth 102 and 102' of a shiftable clutch sleeve Q which is adapted to be shifted forwardly or rearwardly by a fork 112 fixed to a longitudinally extending shift rail 113 (Fig. 14) disposed on the left side of shaft 93 (looking forwardly of the vehicle).

The drive pinion 90 is hollow and journals, by a bearing 92, the forward end of the intermediate transmission driven shaft 93 which is adapted to drive the tailshaft 103. The latter may carry the usual propeller shaft brake drum having braking mechanism operably associated therewith (not shown). The drive pinion 90 is continuously meshed with a gear 96 for driving the countershaft cluster 97 rotatable on a countershaft support 98.

The cluster 97 also includes a gear 107 which drives a pump P (Figs. 9 and 16). The pump P develops the fluid pressure necessary to the operation of the automatic phase of the transmission and for lubrication thereof and is of the well known Gerotor type having an inner driving member 123 and an outer driven member 124 defining intake and delivery chambers 125 and 126, respectively. The driving member 123 is secured to a shaft 127 rotatable in a stationary pump housing 128 closed by a cover 129 at its outer end. The upper end of shaft 127 carries a gear 130 which meshes with the pump drive gear 107 of the countershaft cluster 97.

The intake of suction chamber 125 receives a constant supply of oil through an inlet passage 131 which opens into the oil reservoir or sump 132 along the bottom of the underdrive transmission casing 89. The oil under pressure is delivered from the pump pressure chamber 126 upwardly through the delivery passage 137 (Figs. 10 and 14) which is in communication with a restriction valve 94 (Fig. 25). The valve 94 has a plunger 94' which is adapted to be moved against the pressure of a regulating spring 95 for controlling the flow of fluid to the direct speed fluid pressure motor.

The cluster 97 is further formed with gears 106, 108 and 108'. Gear 106 is in constant mesh with a gear 109 which is freely journalled on driven shaft 93. The reverse gear 108' is permanently meshed with an idler gear 118 (Figs. 18 and 19).

A gear 119 slidably splined on the shaft 93 is adapted to be shifted by a shift fork 120 into mesh with the gear 108 to establish emergency low speed ratio drive, or into mesh with the gear 108' to establish reverse drive.

A pair of synchronizing blocker rings 114, 115 are respectively disposed between the hub 104 and gears 90 and 109 and are driven with hub 104 with slight rotational clearance (Fig. 28). These blockers have cammed teeth 116, 116' 117, the pitch circle thereof being the same as that of sleeve teeth 102 and 102', and teeth 101 and 110, and they are adapted to frictionally engage the cone-shaped clutching surfaces 110' and 111 respectively. If desired, energizing springs 122 may be provided between the blockers to lightly urge them into engagement with cones 110' and 111 respectively so that the blocker teeth 116, 117 are misaligned with the sleeve teeth 102 thereby preventing shift of sleeve Q as long as the parts to be clutched are rotating at different speeds. The synchronizing blocker rings are more fully described and claimed in the copending application of O. E. Fishburn, Serial No. 180,840, filed December 20, 1937, now Patent No. 2,333,165, dated November 2, 1943.

As illustrated in Figs. 9 and 28, the second or intermediate speed driven gear 109 has clutch teeth 110 formed thereon and is provided with a reduced sleeve portion 118 which extends forwardly in telescoping relation with the hub 104. A roller clutch, designated generally by the letter F, is disposed between the hub 104 and the extension 118 as more clearly shown in Fig. 22. The hub 104 has cam surfaces 119 formed therein which are adapted to cooperate with rollers 120 to provide a one-way driving connection between the hub and sleeve portion 118 when the rollers are wedged between the said cam surfaces and the outer cylindrical surface of the sleeve. A cage 121 retains the rollers in properly spaced relation. A coil spring 123' is operatively connected between the cage 121 and the hub 104 and urges the cage and rollers in a counterclockwise direction of rotation as indicated by the arrow in Fig. 22.

The cage 121 is provided with a pair of diametrically oppositely directed fingers 124' which extend radially outwardly through slots 125' provided in hub 104. The fingers 124' are shaped as shown in Fig. 29 and are of such length that they engage between the teeth 102 and 102' of sleeve Q, a pair of diametrically oppositely disposed teeth having been omitted to provide space for the relatively wide finger as illustrated in Fig. 29.

The hub 104 is provided in its front face with a pair of diametrically oppositely disposed slots 126' which are adapted to receive a pair of lugs 127' carried by the blocker member 114 (Figs. 9, 29 and 24). The slots 126' are larger than the lugs and serve to provide a driving connection between the hub and blocker member which permit relative movement therebetween as will be more fully explained hereinafter.

Similarly, the rear face of hub 104 is provided with a series of slots 128', of which there are four, for receiving the driving lugs 129' of the blocker member 115.

Fig. 29 illustrates the positions of the various parts when the sleeve Q is in neutral position with the tailshaft 103 stationary and the engine running with the clutch C engaged. Under these conditions and looking from the forward end of the vehicle the gear 90 is rotating clockwise and the blocker 114 is rotated by friction to the position shown, the lugs 127' thereof engaging the leading sides of the slots 126'. Similarly, the gear 109 is rotating clockwise thereby causing the lugs 129' of blocker 115 to engage the leading sides of the slots 128'.

The finger 124', which is biased to clockwise rotation, is held in the neutral zone by one of the long sleeve teeth 102, the rollers 120A of clutch F being likewise in neutral as illustrated in Fig. 22.

When sleeve Q is shifted rearwardly (by means which will be described later on herein) the sleeve teeth 102 and 102' will be blocked by engagement of the chamfered ends thereof with the chamfered ends of the blocker teeth 117 until the gear 109 and the sleeve become synchronized through the action of the clutching engagement of the blocker at surface 111. Upon synchronization of the teeth 102 and 110, the blocker will be rotated to non-blocking position assisted by the pressure of the teeth 102 and 102' and the teeth 102 and 102' will slide through the teeth 117 and into engagement with the teeth 110. This position of the sleeve Q is known as the non-freewheeling-second-speed-ratio position and the drive from the shaft 83 is transmitted through gears 90, 96, 106 and 109, sleeve Q and hub 104 to shaft 93.

Forward shift of the sleeve Q from its Fig. 29 position to its Fig. 30 position will permit the finger 124' to rotate forwardly (clockwise) sufficiently under the action of the spring 123' to lock rollers 120A between the cam surfaces 119 and the outer cylindrical surface of the sleeve portion 118 of gear 109 thereby forming a one-way overrunning drive connection between gear 109 and hub 104. This position is known as the free-wheeling-second-speed-ratio position and the drive from shaft 83 is transmitted to shaft 93 through gears 90, 96, 106, 109, rollers 120 and hub 104. Shift of the sleeve to this position will be blocked by engagement of the long teeth 102 with the long blocker teeth 116' until the sleeve Q becomes synchronized with the gear 90 through the action of the clutching surface 110'. It will be noted that the long teeth 102 are chamfered at their forward ends and the teeth 116' are correspondingly chamfered to assist the unblocking movement of the blocker at the instant of synchronization. Fig. 30 illustrates the relative positions of the lugs 127' and the teeth in free-wheeling-second-speed-ratio position.

Further movement of the sleeve Q forwardly during rotation of pinion 90 will be prevented by engagement of the short teeth 102' with the short blocker teeth 116 as illustrated in Fig. 32. This position is known as the drive-block position and occurs during normal operation of the transmission under conditions when the sleeve Q is urged forwardly either by manual or power actuated means (as will be hereinafter explained) during the time that pinion 90 is rotation faster than the shaft 93.

Release of the vehicle accelerator pedal during driving in drive block position will cause the pinion 90 to drop off in speed and when it drops to a speed slightly below the speed of the shaft 93 (which action is assisted by the clutching action of the blocker 114 at the surface 110') the blocker 114 will relatively speaking be rotated backwardly (counterclockwise) to unblock the teeth 102—102' and permit these teeth to pass through into engagement with the clutch teeth 101. This position is illustrated in Fig. 33 and is the direct drive position of the sleeve Q, the shafts 83 and 93 being locked to one another.

During operation of the transmission it sometimes occurs that an attempt will be made to shift the sleeve Q into direct drive position during the time that the shaft 93 and hub 104 are rotating faster than pinion 90. Under such conditions the shift will be prevented by the short blocker teeth 116 which will be engaged by the long teeth 102 of the sleeve. This is the coast-block position illustrated in Fig. 31. If the pinion 90 is accelerated in speed while the parts are in the Fig. 31 position the blocker 114 will rotate forwardly relative to the sleeve under the clutching action at the surface 110', and unblock the teeth 102 but the sleeve will not be completely unblocked because the short blocker teeth 116 will then be engaged by the short sleeve teeth 102' in the drive-block position of the sleeve.

It is therefore apparent that the sleeve Q is blocked against shift under all conditions except when the teeth to be engaged thereby are rotating at substantially synchronous speed relatively thereto. In addition, shift of sleeve Q to drivingly engage the rollers of overrunning clutch F is prevented unless parts 104 and 118 of the clutch are synchronized. These shifting functions will be hereinafter further explained in connection with the operation of the entire transmission.

The mechanism for shifting sleeve Q will now be described. Referring to Figs. 10 to 14, inclusive, it will be seen that the shift yokes or forks 112 and 120 are slidably mounted on a rod 131 carried by the casing 89. Slidable with the yoke 112 is a rail 113, one end of which is carried by a boss 132. The other end portion of the rail is provided with a slot 133 which slidably receives a pin 134. The latter is fixed at each end in a piston 135 slidably disposed in a cylinder 136 formed in the casing. A spring 138 surrounds the rail 113 and abuts the inner surface of the piston and the adjacent surface 139 of a shift element 140. The latter is slidable on the rail 113 and is adapted to abut the portion 141 of the yoke 112 to shift the latter into free-wheeling-second-speed ratio position under manual control of a shift finger 142 which is adapted to engage a slot 143 (Fig. 14) provided in the element 140. Forward shifting movement of the element 140 is limited by a pair of abutment rods 144 which engage the element and prevent shift thereof beyond the free-wheeling-second-speed-ratio position.

The rail 113 is further provided with a bore 145 in which is disposed a second coil spring 146. The latter abuts the pin 134 and the closed end of the bore. Fluid under pressure is adapted to enter cylinder 136 through passage 147, suitable control mechanism, hereinafter to be described, being provided. When the rail 113, yoke 112, sleeve Q and element 140 are in free-wheeling-second-speed ratio position, admission of fluid into cylinder 136 will cause forward movement of piston 135 thereby compressing springs 138 and 146, the pin 134 sliding forwardly in the slot 133. If the sleeve Q is at this instant blocked against shift to direct drive position the yoke 112 cannot, of course, shift. When the sleeve is unblocked it will be shifted to direct drive position by the spring 146 and retained in this position as long as pressure is on in cylinder 136. An outlet port 148 is provided in the cylinder to prevent building up of excess pressure during the time the parts are in direct position. If the pressure in cylinder 136 is cut off, the spring 138 will shift the piston 135 together with the rail 113, yoke 112 and sleeve Q back to free-wheeling-second-speed position, the element 140 remaining all the while in its free-wheeling-second-speed position.

Shift of the sleeve Q to non-free-wheeling-second-speed position is accomplished manually by swinging finger 142 clockwise of Fig. 12 thereby shifting the sleeve into engagement with the clutch teeth 110, and moving the rail 113 and its associated mechanism bodily toward the right, the movement of piston 135 being accommodated by the space 149 in the cylinder head 150.

The low-reverse ratio shift yoke 120 has a portion 151 fixed to a rail 130 which is disposed parallel to and below the rail 113 for sliding movement in bosses 152—153. Shift of the rail 130 to the right of Figs. 13 and 14 will engage gear 119 with reverse idler 118 (Fig. 19) and shift thereof to the left will engage gear 119 with the low speed countershaft gear 108.

Suitable detent mechanism is provided for releasably holding the rails in their various positions. A detent ball 154 is adapted to engage the central of three recesses 155 for holding the rail 113 in neutral position. When the rail is shifted to non-free-wheeling-second-speed position the ball 154 engages the left hand recess, and when the rail is shifted to free-wheeling-second-speed position the ball engages the right hand recess. The rail is retained in direct drive position by the fluid pressure in the cylinder 136 so no detent is necessary.

The rail 130 is provided with recesses 156 which are engaged by a detent ball 157 to releasably hold the rail in neutral, low and reverse positions. An interlock pin 158 (Fig. 14) is adapted to engage one or the other of recesses 159 and 160 provided in rails 113 and 130 respectively to prevent shifting of one rail when the other is in driving position.

The shift finger 142 is carried by a collar 159 which is slidably carried on a rockshaft 160. The latter is carried by a pair of aligned bosses 161—162 formed in the cover plate 163 which is adapted to be secured to the left hand side of the casing 89 over the opening provided therein and shown in Fig. 14. The collar 159 is nonrotatably carried on the rockshaft 160 and is provided with a washer 164 against which a coil spring 165 abuts, the other end of the spring abutting a retainer 166 carried by the rockshaft. The spring 165 continuously urges the collar upwardly and yieldably retains the finger 142 in engagement with the slot 143 of element 140 (Fig. 14). A U-shaped lever 167 pivoted to the cover 163 by shaft 168 (Figs. 11 and 13) has rounded end portions which bear on the top surface of the washer 164. A lever 169 (Figs. 1 and 13) is fixed to the shaft 168 at the outside of the cover by a nut 170. Swinging of the lever 169 will move the collar 159 downwardly of the rockshaft 160 against the force of spring 165 to disengage the finger 142 from slot 143 of element 140 and engage it in slot 170 of the portion 151 of yoke 120.

The rockshaft 160 has a shift lever 171 (Figs. 1 and 10) fixed thereto by a nut 172 for rocking the same to effect shift of rail 113 or 130 depending upon which of the particular slots is engaged by finger 142.

The shift lever 171 and selector lever 169 are controlled by suitable mechanism illustrated in Figs. 1 and 3 to 7, inclusive.

A shift lever 173 is carried by the vehicle steering column, indicated generally by numeral 174.

The lever 173 is carried directly by a casing 175 having separable sections mounted on the steering column 174. The said lever has a knob 176 on its outer end and a forked inner extremity 177 disposed within the casing 175. Provided on the lever 173 adjacent its forked end is a ball-shaped enlargement 178 which is disposed between wear plates 179 and 179A mounted on the opposite side walls of an arcuate slot 180 formed in the casing 175 through which the lever 173 extends. The enlarged portion 178 of the control lever has a bore in which a spring pressed detent ball 181 is disposed. Detent ball 181 is adapted to engage in an aperture formed in the lower wear plate 179 when the lever 173 is centrally located with respect to the opposite ends of the slot. The steering column generally indicated at 174 includes an outer tube on which the casing 175 is mounted and an inner tubular steering shaft 182 which is provided with a steering wheel 183 at the top end thereof as is conventional in the art. The steering shaft 182 extends longitudinally of the steering column and is centrally located with respect to the longitudinal axis thereof.

A tubular shaft 184 extends longitudinally of the steering column and is axially slidably and rotatably supported by the column structure. Mounted in the upper open end of the tubular shaft 184 is a sleeve 185 which is welded or otherwise suitably secured thereto and which extends beyond the upper extremity of this shaft. A collar 186 is concentrically mounted on the portion of the sleeve 185 which extends beyond the shaft 184 and is detachably and non-rotatably held thereon by a nut 187 threaded on the upper end portion of the sleeve as shown in Fig. 3. The collar 186 is provided with diametrically opposed bosses in which are formed holes for receiving bolts 188 which fasten the apertured end portions of the fork 177 to the collar. The bolts or pins 188 pivotally attach the lever to the bosses and the enlarged portion 178 of the lever serves as a fulcrum about which the lever may be oscillated in a vertical plane to shift the shaft 184 axially of the steering column. The shaft 184 may be rotated about its axis which is coincident to the longitudinal axis of the steering column by swinging the lever 173 about the axis of the steering column and during this movement of the lever the enlarged portion 178 thereof slides freely on the bearing surfaces provided by the wear plates 179 and 179A with which the walls of the slot 180 are lined.

At the bottom of the steering column the tube 174 thereof is provided with a slot 189 through which a lever 190 extends. This lever is welded to the lower end of the tubular shaft 184 as illustrated in Fig. 6 and is connected by means of a pin 191 with an operating rod 192.

Partly surrounding the slot 189 is a housing structure 193 which has a tab 194 on which is pivoted a bellcrank lever 195, the latter having a rounded end portion 196 which bears against the enlarged portion 197 of the lever 190. On the opposite side of the steering column the housing structure 193 has a depending bracket 198 which supports the upper end of a Bowden cable structure 199. The flexible, motion transmitting cable 200 of the Bowden cable structure is connected with the lower leg 201 of the bellcrank 195 and a spring 202 is connected between the bellcrank lever and the bracket 198 in such manner that the bellcrank lever continuously urges the shaft 184 upwardly of the column 174.

The rod 192 is connected with one leg of a second bellcrank lever 203 pivoted at 204 on the block of the engine A, the other leg of said bellcrank lever being pivotally connected at 205 with an operating rod 206 which is pivotally connected at its rearward end with the shift lever 171. The opposite end of the motion transmitting cable 200 of the Bowden cable structure 199 is connected with the selector lever 169 as shown in Fig. 1.

It will therefore be understood that the manually operable shift lever 173 is capable of swinging movement about the axis of the steering column in two paths, the said paths being disposed in parallelism one below the other. In shifting the ratio establishing mechanism in casing 89 the lever 173 may be rocked upwardly of the steering column which shifts the shaft 182 axially downwardly of the steering column thereby rocking the bellcrank 195 about its pivot which in turn, through the medium of the Bowden cable structure, swings the selector lever 169 clockwise of Fig. 1 thereupon effecting downward movement of the collar 159 against the force of the spring 165 to disengage the shift finger 142 from the slot 143 and engage it in the slot 170.

The lever 173 is then adapted to be swung in its upper path of movement. Swinging of the lever in a counterclockwise direction as viewed in Fig. 4 will cause the bellcrank lever 203 to be swung in a clockwise direction, this in turn, through tthe medium of the operating rod 206, causing the shift lever 171 to be swung clockwise of Fig. 12 whereupon gear 119 is shifted into engagement with reverse idler 118. Swinging of the lever 173 clockwise of Fig. 4 shifts the gear 119 into engagement with low speed drive gear 108.

Counterclockwise swinging of lever 173 in its lower path of movement will effect shift of the coupling sleeve Q into engagement with clutch teeth 110 thereby establishing non-free-wheeling-second-speed-ratio setting of the transmission, the finger 142, of course, being engaged with the slot 143. Clockwise swinging of the lever 173 will effect shift of sleeve Q into free-wheeling-second-speed-ratio-setting, the shifting movement of the sleeve Q being limited by engagement of the member 140 with the rod 144.

Referring now to Figs. 9, 9A and 21, it may be seen that the intermediate drive shaft 93 is supported by an anti-friction bearing 207 carried by an adaptor plate 208 which is disposed between the housing 89 and a housing 209 which encloses the overdrive unit E. The housing 89, plate 208 and housing 209 are all secured together by suitable securing means, one of the cap screws forming a part thereof being shown at 210.

The rear end portion of the shaft 93 is splined at 211 for connection with the planet carrier 212 of the planetary overdrive unit E. The carrier 212 is provided with mating splines 213 and carries a plurality of axles 214 on which are rotatably mounted a plurality of planet pinions 215. The latter mesh respectively with a sun gear 216 rotatably carried on the shaft 93 and an annulus gear 217 which has a hollow portion 218 extending rearwardly to a splined connection at 219 with the tailshaft 103.

The carrier 212 has a rearwardly extending sleeve portion formed in its outer surface with a plurality of cams 220 which are adapted to cooperate with the rollers 221 of an overrunning one-way clutch H to lock the carrier to the inner cylindrical surface 222 of the annulus gear portion 218 thereby to transmit drive in the forward direction when the shaft 93 tends to overrun the shaft 103. The rollers 221 are spaced by a cage 223 which is urged by a spring 224 toward engaged position. The rollers 221 permit the shaft 103 and annulus 217 to overrun the shaft 93 and carrier 212, but prevent the shaft 93 from overrunning the shaft 103.

Slidably splined on the sun gear 216 at 225 is a sleeve 226 provided with outer splines 227. At the rear end of the sleeve 226, the splines are enlarged to form clutch teeth 228 which are adapted to mesh with clutch teeth 229 integrally formed on the carrier 212. A pair of annular brake elements 230 are carried on the splines 227, the rearwardly disposed element being prevented from sliding relative to the sleeve 226 by a snap ring 231.

The brake elements 230 are adapted for friction engagement by a plurality of brake shoes 232 which are formed of friction material. The shoes or bands 232 are anchored to the casing 209 at four places, Fig. 9B showing one of the anchoring devices in detail.

The brake shoes 232 are carried by annular metal plates 233 which are provided with integral ears 234. The ears 234 extend into slots 235 formed in the housing 209 and shaped to receive the ears. A coil spring 236 acts to urge the outer plates 233 apart, the spring surrounding a bolt 238 which passes through all three ears as illustrated. The inside plate 233 is urged to spaced relation by a spring 237 which is carried by a cup-like sleeve 239 disposed between the forward and middle ears as shown.

The brake shoes 232 are urged into frictional engagement with the elements 230 by a hydraulic piston 240. This piston is of annular shape and surrounds the planetary gearset as illustrated in Fig. 9. The piston has an annular rearwardly extending portion 241 which snugly engages the inner surface of a cylinder 244 formed interiorly of the casing 209 as shown. The casing has a shoulder 243 which extends around the upper half thereof to form a cylinder head, the lower portion of the head being formed inside the casing. Suitable piston rings 242 are provided to insure a good seal.

The lower portion of the cylinder 244 is provided with an opening 245 which communicates with a chamber 246, the latter in turn, being open to a supply pipe or conduit 247.

Admission of pressure fluid into chamber 246 causes forward movement of the piston 240 thereby compressing the brake elements 230 and the brake shoes 232 to hold the sun gear 216 against rotation. It will be seen from Figs. 9, 9A and 9B that, as the rear brake element 230 moves forwardly, it also shifts the sleeve 226 forwardly so that the clutch teeth 228 are disengaged from the clutch teeth 229. The carrier 212 is therefore disengaged from driving relationship with the sun gear 216 when the brake is set to render the sun gear non-rotatable.

Forward movement of the brake elements and shoes compresses the springs 236, 237 and also the springs 248 and 249. The spring 248 acts between the rear brake element 230 and a ring 250 which bears against the adapter plate 208, a sleeve 251 partially enclosing the spring and having a lip engaging the forward brake element in a manner similar to the arrangement of the springs 236. There are a plurality of springs 248 corresponding in number to the springs 236 so that the brake elements and shoes will be maintained in positive non-dragging relationship at all times when pressure is off in chamber 246.

The spring 249 is of greater force than the springs 236, 237 and 248 and bears on the ring 250 and the forward brake element 230 and assists the action of these springs.

The teeth 228—229 are of the well known Maybach type and are adapted to engage under the action of the springs 236, 237, 248 and 249 when pressure is off in chamber 246.

The rearwardly extending portion 218 of the annulus gear 217 is provided with a cylindrical portion on which is non-rotatably carried a helical gear 252 which meshes with a second helical gear 253 carried on the central portion of a shaft 254 which is rotatable in bosses 255. On each end of shaft 254 is secured a plate 256. Each of these plates has a casing 257 secured thereto by screws 258. The casings 257 each contain governor actuated switch mechanisms referred to generally by the letters G and G'.

The governor mechanisms G and G' (Figs. 17, 26 and 27) are each rotatable in the round recesses 259 provided in the casing 209. Each governor comprises a shaft 260 which is rotatable with the shaft 254. The shaft 260 has a head 261 which carries a pair of weights 262 carried by pivot pins 263. The weights are constrained to swing in unison by reason of an equalizer connection 264 and each weight has a stop pin 265 operable in a slot 266 in head 261. The weights are yieldingly urged inwardly by a flat leaf spring 267 which is bowed between stops 268 carried by the weights and after the shaft 260, during car acceleration, is rotating at a predetermined desired speed, the weights swing out thereby further bowing and tensioning the spring 267 and opening the switch which is operably associated with the weights. These switches may be of any suitable construction and the operation thereof will be described later on in connection with the description of operation of the transmission.

The governors G and G' are adapted to operate their respective switches at different speeds, it being necessary to the operation of the transmission to have the governor G, which controls operation of the overdrive piston 240, open its switch at a low speed, and to have the governor G', which controls operation of the direct drive piston 135, open its switch at a relatively higher speed. The governors may be given any desired operating characteristics by substituting various springs 267 of different strengths.

Both governors are constructed so that there is a differential in the operation of the respectively associated switches, the mechanism being arranged so that the switches close at a much lower speed than that required to open them although such relationship may be varied as desired.

Accordingly, the governor weights 262 of governor G' may each carry a ball detent 269 loaded adjustably by a spring 270 such that as the weights spring out, the balls 269 will enter notches 272 in the plate 256 and serve to prevent return of the weights and closing of the associated switch until the desired speed of the car has been reached on retarding the same for example to bring the car to rest. The provision of the ball detents 269 provide a convenient means of adjusting or changing the speed responsive operation of the governor by varying the position of the spring tensioning screws 271.

The governor G is constructed in a similar manner and operates to hold the overdrive gear train in overdriving position until the car speed is reduced to a lower value than that at which the shift to overdrive is made on car acceleration.

Figure 20:
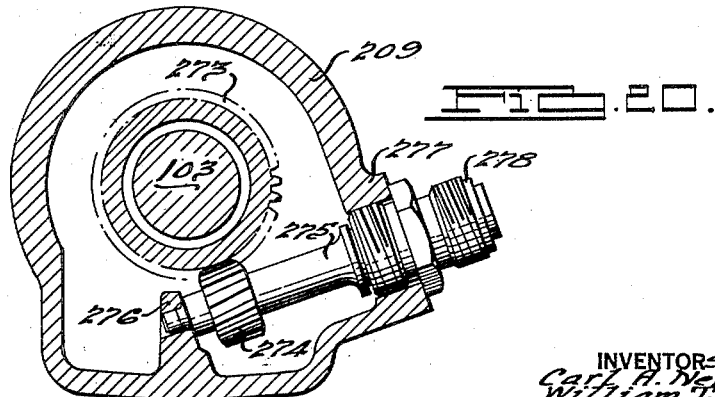
Fig. 20 is a detailed sectional view taken as indicated by the line 20—20 of Fig. 9.

The tailshaft 103 has a helical gear 273 (Figs. 9 and 20) splined thereon which meshes with a mating gear 274 carried by a shaft 275 which is mounted in bosses 276—277 in casing 209. The outer end of the shaft 275 carries a connection member 278 adapted to be connected to the flexible cable (not shown) of a regular speedometer drive mechanism. A ball or other suitable type of bearing 279 supports the tail shaft 103 at the rear end of the casing 209, a suitable seal 280 being interposed between the shaft and casing at the extreme rear end thereof to prevent escape of lubricant. The shaft 103 is adopted to mount a parking brake mechanism (not shown) at 281'.

Referring now to Figs. 9–18, 23–25 and 35, it may be seen that the oil discharged from the pressure chamber 126 of pump P through passage 137 (Figs. 10, 11, 14, 15 and 25) of the casing 89 may flow upwardly into the chamber of valve 94 (Fig. 25) or rearwardly through passage 286 (Figs. 14, 15).

The valve 94 is connected to a valve V' carried by the cover 163 and which controls the action of the direct speed piston 135, by a passage 281. The valve 94 is a restriction valve and functions to prevent drop in pressure in passages 286, 287 and 288 (which connect with the overdrive brake operating motor) when valve V' is opened. This action will be hereinafter more fully explained.

The passage 281 leads into the chamber of valve V' as shown in Figs. 23 and 25, and when the valve is in its open (Fig. 23) position, the fluid flows through ports 295 and 296 into passage 282, thence through passages 283 and 284 into passage 147 which is connected directly to the chamber 149 of the direct speed cylinder 136. The stem 297 of valve V' is urged upwardly to open position by a spring 298'. A solenoid S', carried by a threaded fitting 299 which is threaded into a hole provided in the cover for receiving the same, has a plunger 300 having a reduced stem-like portion 301 depending therefrom. When the coil 302 of solenoid S' is energized, the plunger 300 moves downwardly and as the lower end of the stem 301 rests on the top of the valve stem 297, the latter is moved to closed position and the spring is compressed.

When valve V' is closed (Fig. 24) the stem cuts off communication between ports 295 and 296 and establishes communication between ports 296 and 303. Port 303 connects with passage 285 which drains into the casing.

Passage 286 (Figs. 10, 14 and 15) is disposed in the main casing 89 and is parallel to and below passage 282, and connects with a apssage 287 which leads to the chamber of a valve V, and to a passage 293 which furnishes lubricating fluid to the transmission lubricating system. The valve V is similar to the valve V' and controls operation of the overdrive brake operating motor. The passage 287 connects with the valve V through a passage 283 (Fig. 15) and the system of porting in valve V is arranged in identical manner to that in valve V', the passage 288 being connected through passage 289 with passages 290 and 291 (which connects by way of passage 247 with the chamber 246) when the valve is in open (Fig. 23) position, and the passage 289 being connected to drain passage 292 when the valve is in its closed (Fig. 24) position.

Valve V is controlled by a solenoid S which has a plunger stem 304 adapted to engage a valve stem 305 for moving the latter to closed position against the spring 306.

Between passages 286 and 293 is disposed a valve 307 which serves as the main pressure regulating valve of the system. The valve 307 has a plunger 308 which is urged by a spring 309 to a position cutting off communication between passages 286 and 293. A threaded fitting 310 permits adjustment or replacement of spring 309. The spring 309 is preferably of 40 pounds pressure thereby maintaining a fluid pressure of 40 pounds in the piston actuating part of the system.

A lubrication pressure regulating valve 311 having a plunger 313 urged to cut-off position by a spring 312 is disposed adjacent the valve 307. The valve 311 opens the passage 293 to a drain passage 295 after a pressure of approximately 6 pounds has been attained in passage 293.

The passages 291 and 293 are connected respectively with the passages 247 and 294 by suitable passages (not shown) provided in the adapter plate 208.

Referring now mainly to Fig. 35, it may be seen that the vehicle ignition switch 314, which is connected in the usual manner to the vehicle battery (the opposite pole of which is grounded to the frame), is connected through a wire 315 with one side of a switch 316. The latter (shown also in Figs. 10 and 14) has a plunger 317 which is adapted to rest on a bump 318 formed on the low-reverse shifter yoke 120 when the latter is in neutral position to thereby maintain the switch open. When the yoke 120 is moved forwardly or rearwardly from neutral to shift the transmission into low or reverse speed, a coil spring 319 closes the switch 316. The other side of the switch is connected through wire 320 with one side of the field coil of solenoid S, the other side thereof being grounded through wire 321.

The solenoid S is also adapted to be energized by the governor switch G through wires 322, 323, 324 and 325, and by kickdown switch 77 through wires 322 and 325. The switches 316, G and 77 are connected in parallel and the purpose of each will be presently made clear.

The ignition switch 314 is also connected to one side of a switch 326 through a wire 327. The switch 326 has a plunger 328 which rests on the second-direct rail 113. The latter has a reduced portion 329 which permits the spring 330 to maintain the switch closed when the rail is in neutral and non-free wheeling second position. In all positions except these the switch is open. When the rail 113 is shifted into direct drive position the plunger 328 is thrust upwardly by the full-size portion of the rail and the switch is opened. The other side of the switch 326 is connected to solenoid S' through a wire 331, the other side of the solenoid being connected to ground at 332.

Solenoid S' may also be energized by governor switch G' through wires 327, 333, 334 and 335, and by a switch 336 through wires 327, 333 and 337. The latter switch is adapted for operation by the clutch pedal 84 and energizes the solenoid S' when the pedal is depressed.

The operation of the transmission as a whole will now be described.

Let it be assumed that the vehicle is at rest with the engine A idling and the manually shiftable lever 173 in neutral position. Under such conditions the sleeve Q will be positioned as illustrated in Figs. 9, 28 and 29 and the overdrive sun gear brake elements 230 will be in their free position with the teeth 228 of the sleeve 227 in mesh with the teeth 229 of the planetary carrier 212. Inasmuch as both shift rails 113 and 120 are in neutral position, switch 326 will be closed thereby causing solenoid S' to be energized which maintains valve V' in such a position that the fluid discharged from pump P through passage 137 is prevented from entering the passage 147 which leads to the chamber 149 of the direct speed motor. Under these conditions the governor switch G' is also closed because there is no rotation of annulus gear 217, and the solenoid S' may also receive current through wires 334, 335. Switch 316 is open because the stem 317 thereof is engaged by the bump 318 of the shift yoke 120 but solenoid S is energized by means of the governor switch G which is closed at this time along with the governor switch G'. Thus valve V is closed and pressure fluid is prevented from entering passage 289 which leads to pressure chamber 246 of the overdrive control motor. It may thus be seen that the pressure fluid flowing from the pressure side of the pump P during neutral setting of the transmission provides lubrication for the transmission parts only, the lubrication fluid flowing through the passage 286 and through the valve 307, the plunger 308 thereof being backed up against the pressure of the spring 309 to permit the fluid to flow into the passages 293 and 294, the latter of which connects with a pipe 340 at the rear of the transmission casing (Fig. 9). The pipe 340 also connects with a slip ring 341 which has a plurality of holes communicating with a passage 342 which leads into a bore 343 in the tail shaft 103. The bore 343 is connected with the bore 344 of the shaft 93 by means of a short connection conduit 345. Thus, it may be seen that lubricant may flow through the various passages, pipes and connections into the bores 343 and 344 where it is distributed to suitable lubrication passages such as 345 to the various parts of the transmission.

Reverse speed ratio setting of the transmission may be obtained by first depressing clutch pedal 84 which closes switch 336 and breaks the drive between the engine A and the transmission underdrive unit D by releasing the clutch disc 82 through operation of the release mechanism 85, 86 (Fig. 8). Closing of the switch 336 serves no useful purpose under conditions now being described, the switch 336 being provided to facilitate a shift down in transmission ratio which will be hereinafter more fully described. The manually shiftable lever 173 may now be rocked upwardly of the steering column to disengage shift finger 142 from its normal engagement with the slot 143 of shift yoke 140 and engage it in slot 170 of shift yoke 151 and swung away from the driver whereupon shift yoke 151 and rail 130 will be moved rearwardly of the transmission casing thereby meshing gear 119 with gears 103′ and 118. At the same time switch 316 will be permitted to close under the action of spring 319 thereby providing energization for the solenoid S during the time that the vehicle is travelling in reverse. Unless some means for maintaining solenoid S energized during reverse driving was provided, the overdrive sun gear brake would be set by action of the pressure fluid caused by operation of the governor switch G if the vehicle were driven at a sufficiently high speed in reverse. Should the sun gear brake to set under such conditions, an excessive torque load would be imposed thereon because of the extremely low driving ratio of the reverse gear train, such an occurrence being undesirable and liable to cause slippage of the brake elements. Engagement of the clutch C will then permit the vehicle to be driven in reverse at any speed desired, the hydraulic control circuit being maintained in such condition during reverse driving that neither the overdrive brake motor nor the direct speed shift motor can receive pressure fluid.

Emergency low speed setting of the transmission is obtained in a manner similar to that described above for obtaining reverse setting except that the lever 173 is swung toward the driver while being held in its upper path of movement, which action shifts the yoke 151 and rail 130 forwardly of the transmission casing to engage gear 119 with countershaft driving gear 108. Engagement of clutch C will now cause the vehicle to be driven in emergency low speed ratio, the switches 326 and 316 being closed, thereby maintaining solenoids S and S′ energized which in turn maintains valves V′ and V in closed position.

It is contemplated that emergency low speed setting of the transmission will not be used during ordinary driving of the vehicle because normal low speed setting provides a ratio sufficiently low for starting under all ordinary conditions. However, the emergency low speed gear (which provides an over-all driving ratio of approximately 11 to 1 with a 4.3 axle) is provided for use in instances where an extremely low speed driving ratio is necessary such as when starting up a steep grade with the vehicle loaded or when pulling out of sand pits, etc.

Free-wheeling-second speed setting of the transmission (which is the starting speed ratio for all normal starts) is obtained by first depressing clutch pedal 84 and then swinging the manually shiftable lever 173 toward the driver while said lever is in its lower path of movement with the finger 142 engaged in the slot 143 of shift yoke 140 as illustrated in Figs. 10 and 14 which effects shift of yoke 140 and rail 113 forwardly of the transmission casing to cause sleeve Q to be shifted forwardly to the limit of movement provided by the rod 144 which engages the forward surface of the yoke 140 when the sleeve Q reaches free-wheeling-second speed position. The sleeve Q is now in such position that the teeth 102 thereof are positioned as shown in Fig. 30 and the control finger 124′ of free-wheel cage 121 has moved clockwise under the influence of the spring 123′ sufficiently to permit the rollers 120A to engage the outer cylindrical surface of the portion 118 of gear 109 and the leading surface of the cams 119. The piston 135 has also moved forwardly in cylinder 136 a distance equal to the forward movement of the sleeve Q, the said piston having a follow-up action during the shift of the sleeve Q from neutral to free-wheeling-second speed position. During the movement of the yoke 140 and rail 113 to free-wheeling second speed position, the cam portion 329 of the rail engages the plunger 328 of the switch 326 and opens the switch. This has no immediate effect on the solenoid S′, the field coil of which still receives current through the governor switch G′.

Engagement of clutch C then causes the vehicle to be driven forwardly in free-wheeling-second speed position which provides an over all ratio of 6.66 to 1, the drive being transmitted from the motor A through fluid coupling B and clutch C, shaft 83, pinion 90, gears 96, 106 and 109, overrunning clutch F, hub 104, shaft 93, planetary gearset being locked up in 1 to 1 ratio under such conditions because of the engagement of the teeth 228 and 229 which lock the carrier 212 and sun gear 216 together.

The vehicle may be accelerated in free-wheeling-second speed ratio drive to a speed of approximately 10 m.p.h. which is the operating speed of the overdrive governor control switch G when an up-shift is being made. It is, of course, understood that switch 316 remains open at all times except when the transmission is set for reverse or emergency low speed ratio drive and that the kickdown switch 77 is open at all times except when the accelerator pedal 59 reaches its overtravel position and thereafter remains closed until the accelerator pedal is released a degree sufficient to enable the finger 74 of the switch control lever 73 to open the switch. It may therefore be seen that the solenoid S may be deenergized only through the action of the governor switch G when the transmission is set for free-wheeling-second-speed ratio drive with the accelerator pedal positioned within its normal throttle operating range of movement.

When the vehicle reaches a speed of approximately 10 m.p.h., governor switch G opens thereupon deenergizing solenoid S and permitting the spring 298 to return the valve stem 305 of the valve V to valve open position. Pressure fluid from pump P may now enter the passage 289 which leads to passage 247 through valve V. Chamber 246 of the overdrive brake operating motor thereupon rapidly fills up and piston 240 moves forwardly in the cylinder 244 thereby carrying brake elements 233 and sleeve 226 forwardly to disengage the teeth 228 from the teeth 229 and cause the brake elements 230 to be engaged by the friction brake shoes 232, thereby stopping the sun gear 216 from forward rotation.

This effects shift of the transmission into third speed position which provides an over all driving ratio of 4.62 to 1, the tail shaft 103 now being driven at an overspeed with respect to the shaft 93 through carrier 212, planet gears 215 and annulus gear 217. It should be noted that the shift from second speed ratio drive to third speed ratio drive (which corresponds to a shift from first to second speed in conventional transmissions) is obtained while the vehicle is driving and without necessitating any interruption of the drive by disengagement of the clutch C, interruption of the engine ignition or by other means. The vehicle may now be accelerated in third speed ratio to approximately 20 m.p.h. whereupon the governor switch G′ which governs the action of the piston 135 opens.

Opening of the governor switch G′ deenergizes solenoid S′ and permits the spring 298′ of the valve V′ to return the valve stem 297 to Fig. 23 position whereupon fluid from pump P enters the passage 147 through the valve V′ and fills the chamber 149 of the cylinder 136. Piston 135 thereupon moves forwardly in the cylinder 136 to the limit of movement provided by the slot 133 in rail 113 and compresses springs 138 and 146. So long as drive is maintained on the shaft 83, sleeve Q may only shift forwardly sufficiently for the short teeth 102' thereof to engage the short blocker teeth 116. This is the previously described drive block position of the sleeve Q illustrated in Fig. 32.

Release of the vehicle accelerator pedal to thereby relieve the torque on shaft 83 will permit the engine A to drop toward idle speed thereby causing a sharp drop in the speed of the shaft 83, the shaft 93 and the other associated transmission mechanism overrunning the shaft 83, gears 109, 106 and 96 and the pinion 90 through the action of the overrunning clutch F. When the speed of the pinion 90 drops to the speed of the shaft 93 and slightly below the speed of the shaft 93, the blocker member 114 will move counterclockwise relative to the hub 104 to the limit of movement permitted by the movement of the lug 127' in the slot 126' thereupon causing the blocker teeth 116 to slide out of blocking position relative to the sleeve teeth 102' and permit the sleeve teeth 102' and 102 to pass through the blocker and into engagement with the clutch teeth 101 and shift of the sleeve Q is rapidly and positively accomplished upon unblocking of the sleeve by the action of the springs 138 and 146 which were previously compressed by forward movement of the piston 135.

Depression of the accelerator pedal will now cause the vehicle to be driven forwardly in fourth speed position at an over all speed ratio of 3 to 1, the shaft 93 being driven at the same speed as the shaft 83 and the tail shaft 103 being driven at an overspeed with respect to shafts 93 and 83. This is the normal cruising speed ratio setting of the transmission and provides good acceleration combined with low engine r.p.m. and maximum economy.

Should greater acceleration be necessary to meet emergency conditions encountered durin gdriving such as when passing cars on hills, etc., an immediate return to third speed ratio setting or direct drive position may be obtained by manipulation of the kickdown mechanism. This is accomplished by the driver actuating the accelerator pedal 59 into its kickdown range of movement beyond wide open throttle position whereupon the throttle control lever 57 engages the stop 58 and the rod 64 travels forwardly in the bore 67 of the lost motion connection mechanism T compressing the spring 69 and engaging the finger 75 of the switch operating lever 73 with the switch operating finger of the switch 77. Kickdown switch 77 is thereupon closed and solenoid S is energized through wires 315, 322 and 325 thereby causing movement of the valve stem 305 of the valve V from its Fig. 23 open position to its Fig. 24 closed position. This cuts off the flow of pressure fluid from passage 288 into passage 289 and opens passage 289 to drain passage 292. Cylinder 243 is therefore rapidly evacuated and brake elements 230 are separated from brake shoes 232 under the action of springs 236, 237 and 248 (Figs. 9A and 9B) which also thrust sleeve 227 rearwardly to mesh teeth 228 and 229.

Upon release of the brake elements 230, the driving ratio of the transmission is immediately shifted downwardly from fourth speed driving ratio to third speed driving ratio (4.3 to 1) and the drive between shafts 93 and 103 is transmitted through the planetary gearset with the carrier 212 locked to th sun gear 216 through the teeth 228 and 229. It frequently happens that due to the difference in speed between the carrier 212 and the sun gear 216 at the instant of release of the brake elements 230 and rearward shift of the sleeve 227, the teeth 228 will not engage with the teeth 229. Under such condtiions the direct drive is immediately established through the overrunning clutch H, the rollers 221 of which wedge between the cams 220 of the carrier 212 and the inner cylindrical surface 222 of the annulus gear extension 218. Thus it may be seen that failure of the teeth 228 and 229 to mesh will not cause loss of drive between the shafts 93 and 103. The sleeve 226 is, of course, continuously urged rearwardly by the springs 236—237, 248 and 249 and the teeth 228 and 229 will be meshed automatically whenever they line up in non-interfering position. The teeth 228 and 229 are of the well-known Maybach type and the sleeve 226 will exert a slight camming action to mesh the teeth under favorable conditions. It is not necessary that the teeth 228 and 229 be meshed during forward driving of the vehicle because forward drive will always be transmitted through the rollers 221 of the overrunning clutch H. During reverse driving of the transmission and when it is desired to use the engine A as a brake for descending grades, it is necessary that the teeth 228 and 229 be meshed in order that a two-way drive may be transmitted between the shafts 93 and 103. It has been found by experience that the sleeve 226 will move rearwardly to mesh the teeth 228 and 229 whenever the transmission is brought to neutral or during shifting of any of the gears while the cylinder 243 is without pressure.

Return from kickdown position to fourth speed driving position may be obtained at any time by release of the accelerator pedal 59 sufficiently to permit it to be returned by the spring 62 to idle position whereupon the finger 74 of the lever 73 will engage the switch operating finger 76 of the kickdown switch 77 and return said switch to open position whereupon solenoid S will be deenergized and spring 298 will open valve V and restore pressure on piston 240. It is assumed, of course, that the vehicle is still travelling at a speed above the critical operating speeds of governor switches G and G'.

When the vehicle speed is reduced, as when coming to a stop, governor switch G' will close at a speed somewhere in the neighborhood of 12 m.p.h thereby venting the cylinder 136. However, the sleeve Q will be retained in its direct drive position because of the frictional load caused by torque transmission through the teeth 101, 102 and 102' until the vehicle reaches a very low speed at which time the spring 138 which acts between the piston 135 and the rear surface of the yoke 140 will move the piston 135 and rail 113 rearwardly to the limit of movement permitted by engagement of the shift yoke portion 141 with the portion 140 thereby disengaging the sleeve Q from the clutch teeth 101 and returning the sleeve Q to free-wheeling-second speed position.

The planetary gearset will remain in overdrive position until the speed of the vehicle is further reduced to approximately 5 m.p.h. whereupon the governor switch G will close, energizing solenoid S and causing operation of the valve V to vent the cylinder 243 whereupon the brake elements 230 will be released and 1 to 1 ratio drive will be established between the shafts 93 and 103 either through the teeth 228 and 229 or the overrunning clutch H. The vehicle is now in free-wheeling-second speed position with the planetary gearing positioned for 1 to 1 ratio drive and the vehicle is ready for a start in its normal first speed ratio or for idling with the transmission in gear, it not being necessary to disengage the manually operable clutch C except when shifting the rails 113 and 130 to or from neutral position.

It may therefore be seen that during normal operation of the vehicle, the manually operable gear shift lever 173 may be left in its free-wheeling-second speed position (which corresponds to high speed position in conventional transmissions) and the vehicle may be driven simply by manipulating the accelerator pedal 59 and the brake pedal of the vehicle (not shown), the gear shift taking place under control of the driver without the necessity of manipulating either the lever 173 or the clutch pedal 84.

Should it be desired to drive the vehicle in second speed position for a considerable length of time without shift of the sleeve Q to direct position and without free-wheeling, as for example when descending long, steep grades or when it is desired to drive the vehicle in a relatively low gear ratio as when traversing snowy roads, etc., the manually operable lever 173 may be shifted away from the driver in its lower path of movement to engage the sleeve Q with the clutch teeth 110 formed on the gear 109. While the rail 113 is in this non-free-wheeling second speed ratio position, switch 326 remains closed and therefore solenoid S' will remain energized at all times making it impossible for cylinder 136 to receive pressure. So long as the vehicle is operated at a speed below 10 m.p.h., the vehicle will be driven in a speed ratio of 6.66 to 1 and two-way drive will be transmitted between the shafts 83, 93 and 103, the overrunning clutch F having been cut out by engagement of the sleeve Q with the clutch teeth 110 and the overrunning clutch H having been cut out by engagement of the teeth 228, 229 under the action of the spring 249 during neutral setting of the transmission. If, under such driving conditions, a speed of 10 m.p.h. is reached, then the solenoid S will be deenergized and the overdrive control cylinder 243 will receive pressure fluid and a shift to third speed (4.62 to 1 ratio) will be obtained. However, it is to be noted that this is also a two-way drive. Thus the same safety conditions will prevail in third speed as in second.

During operation of the vehicle in emergency low speed ratio or in reverse ratio, a two-way drive is obtained because overrunning clutches F and H are inoperative under these conditions and in addition both solenoids S' and S are maintained in energized condition through the action of the switches 326 and 316 so that the automatic functioning of the transmission is inoperative.

Shift from non-free-wheeling-second speed ratio setting to free-wheeling-second-speed ratio setting may be obtained at any time during driving of the vehicle in non-free-wheeling speed ratio setting by depression of the clutch pedal 84 and movement of the manually operable lever 173 from its non-free-wheeling-second speed ratio position to its free-wheeling-second speed ratio position and release of the clutch pedal 84 whereupon shift of sleeve Q to direct drive position will be obtained automatically through the action of the governor switch G'.

It may thus be seen that we have provided a transmission for driving a motor vehicle which combines all of the advantages of the conventional three speed and reverse transmission and automatic transmission. Selective control is provided which permits the vehicle driver to select any desired speed ratio or driving condition and the transmission remains under positive control of the driver at all times regardless of whether it is positioned for automatic or manual operation.

Our transmission is particularly advantageous for driving under city conditions because it provides automatically, after the manually operable gear shift lever has once been set for forward travel, an upshift during drivingly by the action of the governor switch G and a second upshift upon coast of the vehicle by the action of the governor switch mechanism G'. Such a combination of shifting functions is particularly pleasing to the driver because it permits him to control the time at which the final shift to cruising speed ratio will be made. For example, the shift from free-wheeling-second speed ratio to third speed ratio is made at approximately 10 m.p.h. during driving of the vehicle without any attention on the part of the driver thereof but the shift from third speed driving ratio to fourth or cruising ratio may be made at any speed above 20 m.p.h. depending upon the speed at which the accelerator pedal is released to permit synchronization of the shafts 83 and 93. It is therefore apparent that when exceptional acceleration is desired, the driver may obtain it through natural depression of the accelerator pedal which causes the vehicle to be started from rest in 6.66 to 1 starting ratio which provides a fast start and when the vehicle has accelerated to a speed of 10 m.p.h., operation of the governor switch mechanism G will effect an automatic shift to 4.62 to 1 ratio without interruption of the drive or loss of momentum. The driver may then continue acceleration of the car in this 4.62 to 1 ratio as long as he desires, a shift from third speed driving ratio to fourth speed or 3 to 1 ratio taking place only upon release of the accelerator pedal while the vehicle is travelling at a speed in excess of 20 m.p.h.

After the vehicle has been shifted to fourth speed or cruising ratio, return to third speed may be made at any time by a kickdown operation of the accelerator pedal and acceleration of the vehicle in this kickdown gear position may be continued as long as desired, the return to cruising speed ratio being obtained simply by release of the accelerator pedal. Due to the fact that kickdown of the transmission is obtained without interruption of the drive, an exceptionally smooth and fast kickdown operation of the transmission is obtained. This permits drive of the vehicle under both country driving and city driving conditions in a relatively fast ratio (3 to 1) which permits maximum economy, the fast acceleration necessary for maneuvering in city traffic being obtained by kickdown operation of the accelerator pedal.

The kickdown function of the transmission is also available during drive of the vehicle in both free-wheeling-second-speed position and non-free-wheeling-second-speed position. This feature makes it possible for the driver to drive the vehicle at speeds in excess of 10 m.p.h. in 4.62 to 1 speed ratio and to immediately effect a return to 6.66 to 1 speed ratio by manipulation of the accelerator pedal into its overtravel range of movement. This is an important advantage in that it proves positive and flexible control of speed ratios under all conditions of vehicle drive.

Another important feature of the invention resides in the novel valve arrangement, particularly that of the restriction valve 94. Referring to Figs. 25 and 35, it will be seen that the valve 94 is positioned in the hydraulic circuit between the valves V and V', and functions to prevent loss of pressure in one of the motor supply branches during the period that the other motor supply branch is filling.

For example, let it be assumed that the vehicle is being driven in third speed ratio (4.62 to 1). Under such conditions, valve V is open and pressure is on in the overdrive control cylinder 244, the spring 309 of valve 307 acting to maintain the fluid pressure at sufficient value to prevent slippage of the brake elements 230. In the present embodiment, the valve 307 is set to maintain a pressure of 40 pounds per square inch which is more than sufficient to hold the brake elements 230 under the torque conditions existing during driving with the sleeve Q in underdrive position. The pressure delivered by pump P is of course sufficient at all times during normal driving to move the plunger 308 off its seat and supply pressure to passages 293 and 294 for lubrication of the transmission, the valve 311 acting to maintain a pressure of approximately 6 pounds per square inch in these passages.

When, during driving under the aforesaid conditions, a speed of approximately 20 m.p.h. is reached, solenoid S' is deenergized and valve V' opens to permit pressure fluid to flow into passage 147 and chamber 149 of cylinder 136. During the time that the aforesaid passage and chamber are filling the pressure in the entire system would drop to zero if some regulating means was not provided. If the pressure were permitted to drop to zero, or to some value below that necessary to hold the sun gear 216 against rotation, slippage of brake elements 230 would occur. Such a contingency is prevented by the restriction valve 94. The spring 95 thereof is set to maintain a pressure of 30 pounds per square inch in the supply passages, therefore, the pressure on piston 240 will not drop below 30 pounds during operation of the piston 135. A pressure of 30 pounds per square inch is sufficient to hold the sun gear under all normal driving conditions (the switch 316 preventing energization of cylinder 244 during driving in emergency low and reverse ratios when abnormally high torque is sometimes required) thus it may be seen that the shift from third speed ratio to high speed ratio is accomplished without roughness or shock due to fluctuating pressure in the hydraulic system.

When both the cylinder 244 and the cylinder 136 are energized, the passage 148 is also open, the spring 138 being of such strength that it tends to maintain a pressure of 40 pounds in the system. It is apparent that the control springs 138 and 309 should function to maintain approximately equal pressure in order that the lubricating passage 293 will receive pressure and the pump P will not be required to supply higher pressures than are required for proper operation of the transmission.

The valve 94 functions in a manner similar to that just described during the kickdown operation. Upon closing of the kickdown switch 77 during cruising of the vehicle in 3 to 1 ratio, the solenoid S is deenergized and cylinder 244 is vented through passage 292. The vehicle is then driven in the kickdown ratio of 4.3 to 1, the shafts 83, 93 and 103 all being connected for direct drive therebetween. Upon a return to the 3 to 1 cruising ratio, valve V is opened and pressure fluid flows into cylinder 244. If it were not for valve 94, the pressure behind piston 135 would drop to zero while cylinder 244 is being filled and although pressure probably would be held in engaged position by the frictional load on the teeth thereof, a release of driving torque at this time would cause the sleeve to wholly or partially disengage and damage to the parts might occur upon build-up of pressure in chamber 149.

It may thus be seen that the valve 94 performs an important and novel function in the operation of the transmission.

Having thus described the preferred embodiment of our invention, we wish to point out that by so doing, we do not wish to limit the same in any way, shape or form, except as defined by the scope of the claims appended hereto.

We claim:

1. In a power transmission for driving a motor vehicle having an engine, a driving shaft adapted to be driven by the engine; and a driven shaft adapted to drive the vehicle; an intermediate shaft disposed between said driving and driven shafts; means for selectively driving the intermediate shaft from the driving shaft at the speed of the driving shaft and at a plurality of speed ratios relatively thereto; means for selectively driving the driven shaft from the intermediate shaft at the speed of the intermediate shaft and at a different speed ratio relatively thereto; said first means including a plurality of sets of positively engageable teeth adapted for selective manual and power actuation to drivingly connect the driving and intermediate shafts, and said second means including friction elements adapted for engagement by power operated means during driving of the vehicle.

2. In a power transmission for driving a motor vehicle having an engine, a driving shaft adapted to be driven by the engine; and a driven shaft adapted to drive the vehicle; an intermediate shaft disposed between said driving and driven shafts; means for selectively driving the intermediate shaft from the driving shaft at the speed of the driving shaft and at a plurality of speed ratios relatively thereto; means for selectively driving the driven shaft from the intermediate shaft at the speed of the intermediate shaft and at a different speed ratio relatively thereto; said first means including a plurality of sets of positively engageable teeth adapted for selective manual and power actuation to drivingly connect the driving and intermediate shafts, and said second means including friction elements adapted for engagement by power operated means during driving of the vehicle; and control means operably associated with said first means for restricting operation of said second means during operation of said first means in driving the intermediate shaft at certain of said speed ratios.

3. In a power transmission for driving a motor vehicle having an engine, a driving shaft adapted to be driven by the engine; and a driven shaft adapted to drive the vehicle; an intermediate shaft disposed between said driving and driven shafts; means for selectively driving said intermediate shaft from said driving shaft at the same speed thereof and at a plurality of reduced speeds relatively thereto; means for selectively driving said driven shaft from said intermediate shaft at the speed of said intermediate shaft and at an overspeed relatively thereto; means including selectively operable motor means for controlling both said driving means; and a plurality of control means carried by the vehicle for controlling operation of said motor means.

4. In a power transmission for driving a motor vehicle having an engine, a driving shaft adapted to be driven by the engine; and a driven shaft adapted to drive the vehicle; an intermediate shaft disposed between said driving and driven shafts; means for selectively driving said intermediate shaft from said driving shaft at the same speed thereof and at a plurality of reduced speeds relatively thereto; means for selectively driving said driven shaft from said intermediate shaft at the speed of said intermediate shaft and at an overspeed relatively thereto; means including selectively operable fluid pressure motors for controlling both said driving means; and a plurality of control means carried by the vehicle for controlling operation of said motors.

5. In a power transmission for driving a motor vehicle having an engine, a driving shaft adapted to be driven by the engine; and a driven shaft adapted to drive the vehicle; an intermediate shaft disposed between said driving and driven shafts; means for selectively driving said intermediate shaft from said driving shaft at the same speed thereof and at a plurality of reduced speeds relatively thereto; means for selectively driving said driven shaft from said intermediate shaft at the speed of said intermediate shaft and at an overspeed relatively thereto; means including selectively operable fluid pressure motors for controlling both said driving means; and a plurality of control means including speed responsive means carried by the vehicle for controlling operation of said motors; said control means being constructed and arranged such that upon acceleration of said vehicle from rest to a predetermined speed, one of said motors is operable for effecting automatic step-up in speed ratio between said intermediate shaft and said driven shaft and automatic step-up in speed ratio between said driving shaft and said intermediate shaft is effected by another of said motors when said vehicle is traveling at a relatively higher predetermined speed.

6. In a power transmission for driving a motor vehicle having an engine and a driving shaft driven by the engine, an intermediate shaft; means including gearing for driving said intermediate shaft from said driving shaft in a plurality of forward speed ratios and in reverse speed ratio; a driver operable control element for selecting said speed ratios; a driven shaft adapted to drive the vehicle; means including gearing for driving said driven shaft from said intermediate shaft in a plurality of forward speed ratios; power operated means operable automatically in response to vehicle speed for effecting change in the driving speed ratio between said intermediate and driven shafts; and means operable in response to operation of said control element in selecting certain speed ratios for rendering said power operated means inoperable.

7. In a power transmission for driving a motor vehicle having an engine and a driving shaft driven by the engine, an intermediate shaft; means including gearing for driving said intermediate shaft from said driving shaft in a plurality of forward speed ratios and in reverse speed ratio; a driver operable control element for selecting said speed ratios; a driven shaft adapted to drive the vehicle;

means including gearing for driving said driven shaft from said intermediate shaft in a plurality of forward speed ratios; power operated means operable automatically in response to vehicle speed for effecting change in the driving speed ratio between said intermediate and driven shafts; and means operable in response to operation of said control element into reverse speed ratio for rendering said power operated means inoperable.

8. In a power transmission for driving a motor vehicle having an engine and a driving shaft driven by the engine; an intermediate shaft; means including gearing for driving said intermediate shaft from said driving shaft in a plurality of forward speed ratios and in reverse speed ratio; a driver operable control element for selecting said speed ratios; a driven shaft adapted to drive the vehicle; means including gearing for driving said driven shaft from said intermediate shaft in a plurality of forward speed ratios; power operated means operable automatically in response to vehicle speed for effecting change in the driving speed ratio between said intermediate and driven shafts; and means operable in response to operation of said control element into reverse speed ratio or into the lowest of said forward speed ratios for rendering said power operated means inoperable.

9. In a power transmission for driving a motor vehicle having an engine and a driving shaft driven by the engine; an intermediate shaft; means including a gearset and a manually operable shift lever for driving said intermediate shaft from said driving shaft in low, intermediate and direct forward speeds and in reverse speed; a driven shaft adapted to drive the vehicle; means including a second gearset connecting said intermediate shaft with said driven shaft and operable to drive the driven shaft at the speed of the intermediate shaft or at a speed different from the speed of the intermediate shaft; power operated drive control means for controlling operation of said second gearset; vehicle speed responsive means for controlling said power operated means; and means operable in response to manipulation of said shift lever into low or reverse speed position for rendering said speed responsive means inoperable.

10. In a power transmission for driving a motor vehicle having an engine and a driving shaft driven by the engine; an intermediate shaft; means including a gearset and a manually operable shift lever for driving said intermediate shaft from said driving shaft in low, intermediate and direct forward speeds and in reverse speed; a driven shaft adapted to drive the vehicle; means including a second gearset connecting said intermediate shaft with said driven shaft and operable to drive the driven shaft at the speed of the intermediate shaft or at a speed different from the speed of the intermediate shaft; power operated drive control means for controlling shifting operation of said respective gearsets; and means operable in response to manipulation of said shift lever into low or reverse positions for rendering said drive control means inoperable.

11. In a power transmission for driving a motor vehicle having an engine and a driving shaft driven by the engine; an intermediate shaft; means including a gearset and a manually operable shift lever for driving said intermediate shaft from said driving shaft in low, intermediate and direct forward speeds and in reverse speed; a driven shaft adapted to drive the vehicle; means including a second gearset connecting said intermediate shaft with said driven shaft and operable to drive the driven shaft at the speed of the intermediate shaft or at a speed different from the speed of the intermediate shaft; power operated drive control means for controlling shifting operation of said respective gearsets; and means operably associated with said shift lever for controlling operation of said drive control means.

12. In a power transmission for driving a motor vehicle having an engine, a driving shaft adapted to be driven by the engine and a driven shaft adapted to drive the vehicle, an intermediate shaft adapted to connect said shafts; selectively operable gear means for driving the intermediate shaft from the driving shaft at the same speed thereof or at a plurality of reduced speeds relatively thereto; a second gear means for driving the driven shaft from the intermediate shaft at the same speed thereof or at an overspeed relatively thereto; a manually operable shift lever for controlling operation of said first gear means; power operated means adapted for automatic operation in response to vehicle speed for controlling operation of said second gear means; and means for rendering said power operated means inoperable when said first gear means is set for slowest speed drive.

13. In a power transmission for a motor vehicle having an engine, a driving shaft adapted to be driven by the engine and a driven shaft adapted to drive the vehicle, an intermediate driving shaft adapted to connect said driving and driven shafts; means including an overrunning clutch for establishing a free-wheeling speed reducing drive connection between said driving shaft and said intermediate shaft; means including a positive clutch for establishing a non-free-wheeling speed reducing drive between the said driving and intermediate shafts, both of said drives having the same reduction ratio; manually operable means for selecting said drives; overdrive means disposed between said intermediate shaft and said driven shaft for driving the driven shaft at the speed of the intermediate shaft or at an overspeed relatively thereto; power operated drive control means for controlling said overdrive means including vehicle speed responsive device, said device being operable to automatically effect a step-up in the overall transmission driving ratio in response to attainment of predetermined speed when said vehicle is driven in either of said speed reducing drives.

14. In a motor vehicle drive having a rotatable driving structure adapted to receive drive from the engine and a rotatable driven structure adapted to transmit drive from the driving structure for driving the vehicle, means for establishing a plurality of different speed ratio driving connections between the driving and driven structures, one of said driving connections including an overrunning clutch adapted when engaged to transmit a one-way overrunning drive between said structures; and blocker means operably associated with said structures for blocking an operation of said drive connection establishing means intended to effect engagement of said clutch and establishment of said one driving connection when the speeds of said structures are asynchronous.

15. In a motor vehicle drive having a rotatable driving structure adapted to receive drive from the engine and a rotatable driven structure adapted to transmit drive from the driving structure for driving the vehicle, means for establishing a one-way overrunning drive connection between said structures, and blocker means operably associated with said structures operable for blocking an operation of said means intended to effect establishment of said drive connection during asynchronous rotation of said structures.

16. In a motor vehicle drive having a rotatable driving structure adapted to receive drive from the engine and a rotatable driven structure adapted to transmit drive from the driving structure for driving the vehicle, means for establishing a one-way overrunning drive connection between said structures, and blocker means operably associated with said structures for blocking an operation of said means intended to effect establishment of said drive connection during asynchronous rotation of said structures; said blocker means comprising a member rotatably carried by one of said structures having means drivingly connecting with the other of said structures and accommodating limited rotation relatively therebetween, the said member being adapted to block said drive establishing connection when it rotatably leads the connected member.

17. In a motor vehicle drive having a rotatable driving structure adapted to recieve drive from the engine and a rotatable driven structure adapted to transmit drive from the driving structure for driving the vehicle, means including a member shiftable relatively to said structures for establishing a one-way overrunning drive connection between said structures and blocker means operably associated with said shiftable member for blocking an operation of said shiftable member intended to effect establishment of said one way driving connection drive-establishing shift thereof during asynchronous rotation of said structures.

18. In a motor vehicle drive having a rotatable driving structure adapted to receive drive from the engine and a rotatable driven structure adapted to transmit drive from the driving structure for driving the vehicle, means for establishing a driving connection between said structures including an overrunning clutch adapted when engaged to transmit a one-way overrunning drive between said structures; means including a sleve shiftable axially of said structures for controlling engagement and disengagement of said clutch, and blocker means operably associated with said sleeve for blocking an operation of said sleeve intended to effect establishment of said one-way drive during asynchronous rotation of said structures.

19. In a motor vehicle drive having a rotatable driving structure adapted to receive drive from the engine and a rotatable driven structure adapted to transmit drive from the driving structure for driving the vehicle, means for establishing a driving connection between said structures including an overrunning clutch adapted when engaged to transmit a one-way overrunning drive between said structures; means including a sleeve shiftable axially of said structures for controlling engagement and disengagement of said clutch; a blocker member operably associated with said structures and having a driving connection with one of the structures, said driving connection accommodating limited relative rotational movement between the blocker member and the connected structure; said blocker member being constructed and arranged such that it prevents an operation of said sleeve intended to effect establishment of said one-way drive during asynchronous rotation of said structures.

20. In combination, co-acting power transmitting structures having means for engaging with one another, said means including a roller clutch adapted when engaged to transmit a one-way overrunning drive between said structure; a member carried by one of the structures and shiftable relatively thereto for controlling engagement and disengagement of said clutch, and means operable during asynchronous rotation of said structures for preventing an operation of said member intended to effect establishment of said one-way drive.

21. In a motor vehicle drive having a rotatable driving structure adapted to receive drive from the engine and a rotatable driven structure adapted to transmit drive from the driving structure for driving the vehicle, roller clutch means for establishing a driving connection between said structures including a cage for controlling engagement and disengagement of said rollers; spring means for urging said cage to engaged position; a shiftable member; means operably connecting said shiftable member and said cage for holding said cage in disengaged position prior to drive engaging shift of said member; and blocker means operably associated with said structures for blocking an operation of said shiftable member intended to effect engagement of said cage and establishment of said drive connection by said clutch means during asynchronous rotation of said structures.

22. In a motor vehicle drive having a rotatable driving structure adapted to receive drive from the engine and a rotatable driven structure adapted to transmit drive from the driving structure for driving the vehicle, roller clutch means for establishing a driving connection between said structures including a cage for controlling engagement and disengagement of said rollers; spring means for urging said cage to engaged position; a shiftable member; means operably connecting said shiftable member and said cage for holding said cage in disengaged position prior to drive engaging shift of said member; a blocker member rotatably carried by one of said structures and having a lost motion driving connection with the other of said structures, said blocker member being constructed and arranged such that it blocks an operation of said shiftable member intended to effect engagement of said cage and establishment of said drive connection by said clutch means during asynchronous rotation of said structures.

23. In a motor vehicle drive having a rotatable driving structure adapted to receive drive from the engine and a rotatable driven structure adapted to transmit drive from the driving structure for driving the vehicle, roller clutch means for establishing a driving connection between said structures including a cage for controlling engagement and disengagement of said rollers; spring means for urging said cage to engaged position; a shiftable member; means operably connecting said shiftable member and said cage for holding said cage in disengaged position prior to drive engaging shift of said member; a blocker member rotatably carried by one of said structures and having a lost motion driving connection with the other of said structures, said blocker member being constructed and arranged such that it blocks an operation of said shiftable member intended to effect engagement of said cage and establishment of said drive connection by said clutch means during rotation of said driven structure faster than said driving structure.

24. In a motor vehicle drive having a rotatable driving structure adapted to receive drive from the engine and a rotatable driven structure adapted to transmit drive from the driving structure for driving the vehicle, roller clutch means for establishing a driving connection between said structures including a cage for controlling engagement and disengagement of said rollers; spring means for urging said cage to engaged position; a shiftable member; means operably connecting said shiftable member and said cage for holding said cage in disengaged position prior to drive engaging shift of said member; a blocker member rotatably carried by one of said structures and having a lost motion driving connection with the other of said structures, said blocker member being constructed and arranged such that it blocks an operation of said shiftable member intended to effect engagement of said cage and establishment of said drive connection by said clutch means during rotation of said driven structure faster than said driving structure.

25. In a motor vehicle drive having a rotatable driving structure adapted to receive drive from the engine and a rotatable driven structure adapted to transmit drive from the driving structure for driving the vehicle, a first set of teeth carried by the driving structure; a second set of teeth carried by the driven structure; a sleeve carried by said second set of teeth and shiftable relatively thereto for engaging with the first set of teeth thereby to establish a direct driving connection between said structures; means including a roller clutch for establishing a reduced speed driving connection between said structures; means for controlling engagement and disengagement of said clutch including an element operably connected with said sleeve; said sleeve being constructed and arranged such that forward shifting movement thereof from neutral effects establishment of said reduced speed driving connection and further shifting movement in the same direction effects establishment of said direct driving connection; and a blocker member disposed between said sets of teeth and adapted to block forward engaging shift of said sleeve with said first set of teeth from neutral or from reduced speed drive position during asynchronous rotation of said shafts.

26. In a motor vehicle drive having a rotatable driving structure adapted to receive drive from the engine and a rotatable driven structure adapted to transmit drive from the driving structure for driving the vehicle, a first set of teeth carried by the driving structure; a second set of teeth carried by the driven structure; a sleeve carried by said second set of teeth and shiftable relatively thereto for engaging with the first set of teeth thereby to establish a direct driving connection between said structures; an overrunning clutch device operably disposed between said structures, said clutch device including a member adapted to be rotated relatively to said structures for establishing a reduced speed driving connection therebetween, said member having a control element carried thereby and adapted for engagement by said sleeve for controlling the position of said member; the disposition of the parts being such that said sleeve is adapted for shifting movement in one direction to establish said reduced speed driving connection and for further shifting movement in the same direction for establishing said direct driving connection; and a blocker member disposed between said sets of teeth and adapted to block an operation of said sleeve during its shifting movement from neutral and asynchronous rotation of said structures, which movement is intended to effect establishment of said reduced speed driving connection.

27. In a motor vehicle drive having a rotatable driving structure adapted to receive drive from the engine and a rotatable driven structure adapted to transmit drive from the driving structure for driving the vehicle, a first set of teeth carried by the driving structure; a second set of teeth carried by the driven structure; a sleeve carried by said second set of teeth and shiftable relatively thereto for engaging with the first set of teeth thereby to establish a direct driving connection between said structures; an overrunning clutch device operably disposed between said structures, said clutch device including a member adapted to be rotated relatively to said structures for establishing a reduced speed driving connection therebetween, said member having a control element carried thereby and adapted for engagement by said sleeve for controlling the position of said member; the disposition of the parts being such that said sleeve is adapted for shifting movement in one direction to establish said reduced speed driving connection and for further shifting movement in the same direction for establishing said direct driving connection; and a blocker member operably associated with said sleeve and adapted to block an operation of said sleeve during its shifting movement in said one direction and asynchronous rotation of said structures, which movement is intended to effect establishment of said reduced speed driving connection.

28. In a motor vehicle drive having a rotatable driving structure adapted to receive drive from the engine and a rotatable driven structure adapted to transmit drive from the driving structure for driving the vehicle, a first set of teeth carried by the driving structure; a second set of teeth carried by the driven structure; a sleeve carried by said second set of teeth and shiftable relatively thereto for engaging with the first set of teeth thereby to establish a direct driving connection between said structures; an overrunning clutch device operably disposed between said structures, said clutch device including a member adapted to be rotated relatively to said structures for establishing a reduced speed driving connection therebetween, said member having a control element carried thereby and adapted for engagement by said sleeve for controlling the position of said member; the disposition of the parts being such that said sleeve is adapted for shifting movement in one direction to establish said reduced speed driving connection and for further shifting movement in the same direction for establishing said direct driving connection; and a blocker member disposed between said sets of teeth and adapted to block shift of said sleeve from reduced speed driving position to direct driving position during rotation of the driving structure at a speed faster than that of the driven structure.

29. In a motor vehicle drive having a rotatable driving structure adapted to receive drive from the engine and a rotatable driven structure adapted to transmit drive from the driving structure for driving the vehicle, a first set of teeth carried by the driving structure; a second set of teeth carried by the driven structure; a sleeve carried by said second set of teeth and shiftable relatively thereto for engaging with the first set of teeth thereby to establish a direct driving connection between said structures; an overrunning clutch device operably disposed between said structures, said clutch device including a member adapted to be rotated relatively to said structures for establishing a reduced speed driving connection therebetween, said member having a control element carried thereby and adapted for engagement by said sleeve for controlling the position of said member; the disposition of the parts being such that said sleeve is adapted for shifting movement in one direction to establish said reduced speed driving connection and for further shifting movement in the same direction for establishing said direct driving connection; and a blocker member disposed between said sets of teeth and adapted to block shift of said sleeve from neutral when said driving structure is rotating faster than said driven structure and to block shift of said sleeve from reduced speed driving position to direct driving position during rotation of either of said structures faster than the other.

30. In a motor vehicle drive having a rotatable driving structure adapted to receive drive from the engine and a rotatable driven structure adapted to transmit drive from the driving structure for driving the vehicle, a first set of teeth carried by the driving structure; a second set of teeth carried by the driven structure; a third set of teeth; means drivingly connected the second and third sets of teeth together to accommodate limited rotation relatively therebetween; means for mounting said second set of teeth for shifting movement relative to said third set of teeth; means operable in response to shift of said second set of teeth toward said first set of teeth for establishing an overrunning drive connection between said structures; means operable in response to engagement of said second set of teeth with said first set of teeth for establishing a two-way drive connection between said structures; and means including the disposition of said third set of teeth for blocking shift of said second set of teeth from neutral into overrunning drive establishing position when said driving structure is overrunning said driven structure and for blocking shift of said second set of teeth into engagement with said first set of teeth during asynchronous rotation of said structures.

31. The combination set forth in claim 30 wherein said third set of teeth includes teeth of different lengths, the longer teeth being adapted to block shift of said second set of teeth into overrunning drive establishing position and the shorter teeth being adapted to block shift of said second set of teeth into engagement with said first set of teeth.

32. In a motor vehicle drive having a rotatable driving structure adapted to receive drive from the engine and a rotatable driven structure adapted to transmit drive from the driving structure for driving the vehicle, a hub carried by the driven structure; a gear driven by the driving structure; an overrunning clutch operably disposed between said hub and said gear and adapted when engaged to transmit a one-way overrunning drive therebetween; a set of clutch teeth carried by said driving structure; a shiftable sleeve non-rotatably carried by said hub and adapted for shifting into engagement with said clutch teeth for establishing a direct drive between said structures; said overrunning clutch including a control finger operably connected with said sleeve and adapted to disengage said overrunning clutch when said sleeve is in neutral position; means for engaging said overrunning clutch in response to shift of said sleeve to a position intermediate its neutral position and its direct drive position; a blocking member disposed between said hub and said clutch teeth, said blocking member having means carried thereby adapted to block shift of said sleeve from neutral to intermediate position during overrun of said driven structure by said driving structure but accommodating said shift when said structures are stationary or are rotating in synchronism or when said driven structure is overrunning said driving structure.

33. In a motor vehicle drive having a rotatable driving structure adapted to receive drive from the engine and a rotatable driven structure adapted to transmit drive from the driving structure for driving the vehicle, a hub carried by the driven structure; a gear driven by the driving structure; an overrunning clutch operably disposed between said hub and said gear and adapted when engaged to transmit a one-way overrunning drive therebetween; a set of clutch teeth carried by said driving structure; a shiftable sleeve non-rotatably carried by said hub and adapted for shifting into engagement with said clutch teeth for establishing a direct drive between said structures; said overrunning clutch including a control finger operably connected with said sleeve and adapted to disengage said overrunning clutch when said sleeve is in neutral position; means for engaging said overrunning clutch in response to shift of said sleeve to a position intermediate its neutral position and its direct drive position; a blocking member disposed between said hub and said clutch teeth, said blocking member having means carried thereby adapted to block shift of said sleeve from neutral to intermediate position during overrun of said driven structure by said driving structure but accommodating said shift when said structures are stationary or are rotating in synchronism or when said driven structure is overrunning said driving structure; said blocking member also having means carried thereby adapted to block shift of said sleeve from intermediate to direct drive position during overrun of either of said structures relatively to the other but accommodating said shift when said structures are stationary or rotating in synchronism.

34. The combination set forth in claim 33 wherein the said sleeve is provided with long and short teeth adapted for engagement with said clutch teeth and said blocking member is provided with long and short teeth adapted respectively to engage the aforesaid long and short teeth thereby to block shift of said sleeve.

35. In a motor vehicle drive having a rotatable driving structure adapted to receive drive from the engine and a rotatable driven structure adapted to transmit drive from the driving structure for driving the vehicle, a hub carried by the driven structure; a gear driven by the driving structure; an overrunning clutch operably disposed between said hub and said gear and adapted when engaged to transmit a one-way overrunning drive therebetween; a set of clutch teeth carried by said driving structure; a shiftable sleeve non-rotatably carried by said hub and adapted for shifting into engagement with said clutch teeth for establishing a direct drive between said structures; said overrunning clutch including a control finger operably connected with said sleeve and adapted to disengage said overrunning clutch when said sleeve is in neutral position; means for engaging said overrunning clutch in response to shift of said sleeve to a position intermediate its neutral position and its direct drive position; a blocking member disposed between said hub and said clutch teeth; long and short teeth carried by said blocking member; long and short teeth carried by said sleeve; means for driving said blocking member from said driven structure accommodating limited relative rotation therebetween; the disposition of said teeth on said blocking member and said sleeve being such that, the long teeth on said blocking member are adapted to engage the long teeth on said sleeve thereby to block shift of the sleeve from neutral to intermediate position during overrun of said driven structure, the short teeth on said blocking member are adapted to engage the long teeth on said sleeve thereby to block shift of the sleeve from intermediate to direct drive position during overrun of said driving structure by said driven structure, and the short teeth on said blocking member are adapted to engage the short teeth on said sleeve thereby to block shift of the sleeve from intermediate to direct drive position during overrun of said driven structure by said driving structure.

36. In a motor vehicle drive having a rotatable driving structure adapted to receive drive from the engine and a rotatable driven structure adapted to transmit drive from the driving structure for driving the vehicle, a hub carried by the driven structure; a gear driven by the driving structure; an overrunning clutch operably disposed between said hub and said gear and adapted when engaged to transmit a one-way overrunning drive therebetween; a set of clutch teeth carried by said driving structure; a shiftable sleeve non-rotatably carried by said hub and adapted for shifting into engagement with said clutch teeth for establishing a direct drive between said structures; said overrunning clutch including a control finger operably connected with said sleeve and adapted to disengage said overrunning clutch when said sleeve is in neutral position; means for engaging said overrunning clutch in response to shift of said sleeve to a position intermediate its neutral position and its direct drive position; a blocking member disposed between said hub and said clutch teeth; long and short teeth carried by said blocking member; long and short teeth carried by said sleeve; means for driving said blocking member from said driven structure accommodating limited relative rotation therebetween; the disposition of said teeth on said blocking member and said sleeve being such that, the long teeth on said blocking member are adapted to engage the long teeth on said sleeve thereby to block shift of the sleeve from neutral to intermediate position during overrun of said driven structure by said driving structure, the short teeth on said blocking member are adapted to engage the long teeth on said sleeve thereby to block shift of the sleeve from intermediate to direct drive position during overrun of said driving structure by said driven structure, and the short teeth on said blocking member are adapted to engage the short teeth on said sleeve thereby to block shift of the sleeve from intermediate to direct drive position during overrun of said driven structure by said driving structure; and means for energizing said blocking member from said driving structure whereby said blocking member is caused to lead or lag said hub within the limits of the aforesaid limited relative rotation.

37. The combination set forth in claim 35 wherein said gear is provided with a set of clutch teeth adapted for engagement by said sleeve for establishing a direct drive between said driven structure and said gear, and a second blocking member disposed between said hub and said gear carrying means for blocking shift of said sleeve into engagement with the clutch teeth of said gear during asynchronous rotation of said gear and hub.

38. In a motor vehicle drive having a rotatable driving structure adapted to receive drive from the engine and a rotatable driven structure adapted to transmit drive from the driving structure for driving the vehicle, a hub carried by one of the structures; a gear driven by the other of said structures; an overrunning clutch operably disposed between said hub and gear and adapted when engaged to transmit a one-way overrunning drive therebetween; a set of clutch teeth carried by the gear-driving structure; a shiftable sleeve non-rotatably carried by said hub and adapted for shifting into engagement with said clutch teeth for establishing a direct drive between said structures; said overrunning clutch including a control finger operably connected with said sleeve and adapted to disengage said overrunning clutch when said sleeve is in neutral position; means for engaging said overrunning clutch in response to shift of said sleeve to a position intermediate its neutral position and its direct drive position; a blocking member disposed in the path of said sleeve; said blocking member having means carried thereby adapted to block an operation of said sleeve in its shifting out of said neutral position and during asynchronous rotation of said structures which shifting is intended to effect engagement of said overrunning clutch.

39. In a motor vehicle drive having a rotatable driving structure adapted to receive drive from the engine and a rotatable driven structure adapted to transmit drive from the driving structure for driving the vehicle, a hub carried by one of the structures; a gear driven by the other of said structures; an overrunning clutch operably disposed between said hub and gear and adapted when engaged to transmit a one-way overrunning drive therebetween; a set of clutch teeth carried by the gear driving structure; a shiftable sleeve non-rotatably carried by said hub and adapted for shifting into engagement with said clutch teeth for establishing a direct drive between said structures; said overrunning clutch including a control finger operably connected with said sleeve and adapted to disengage said overrunning clutch when said sleeve is in neutral position; means for engaging said overrunning clutch in response to shift of said sleeve to a position intermediate its neutral position and its direct drive position; a blocking member disposed in the path of said sleeve, said blocking member having means carried thereby adapted to block an operation of said sleeve in its shifting out of said neutral position and during asynchronous rotation of said structures which shifting is intended to effect engagement of said overrunning clutch; said blocking member also having means carried thereby adapted to block an operation of said sleeve in its shifting out of said intermediate position and during asynchronous rotation of said structures which shifting is intended to effect establishment of said direct drive.

40. In a motor vehicle drive having a rotatable driving structure adapted to receive drive from the engine and a rotatable driven structure adapted to transmit drive from the driving structure for driving the vehicle, a hub carried by one of the structures; a gear driven by the other of said structures; an overrunning clutch operably disposed between said hub and gear and adapted when engaged to transmit a one-way overrunning drive therebetween; a set of clutch teeth carried by the gear driving structure; a shiftable sleeve non-rotatably carried by said hub and adapted for shifting into engagement with said clutch teeth for establishing a direct drive between said structures; said overrunning clutch including a control finger operably connected with said sleeve and adapted to disengage said overrunning clutch when said sleeve is in neutral position; means for engaging said overrunning clutch in response to shift of said sleeve to a position intermediate its neutral position and its direct drive position; a blocking member disposed in the path of said sleeve; means for driving said blocking member from said hub accommodating limited relative rotation therebetween; said blocking member having means carried thereby adapted to block an operation of said sleeve out of neutral to said intermediate position during asynchronous rotation of said structures which operation is intended to effect engagement of said overrunning clutch.

41. In a motor vehicle drive having a rotatable driving structure adapted to receive drive from the engine and a rotatable driven structure adapted to transmit drive from the driving structure for driving the vehicle, a hub carried by one of the structures; a gear driven by the other of said structures; an overrunning clutch operably disposed between said hub and gear and adapted when engaged to transmit a one-way overrunning drive therebetween; a set of clutch teeth carried by the gear driving structure; a shiftable sleeve non-rotatably carried by said hub and adapted for shifting into engagement with said clutch teeth for establishing a direct drive between said structures; said overrunning clutch including a control finger operably connected with said sleeve and adapted to disengage said overrunning clutch when said sleeve is in neutral position; means for engaging said overrunning clutch in response to shift of said sleeve to a position intermediate its neutral position and its direct drive position; a blocking member disposed in the path of said sleeve; means for driving said blocking member from said hub accommodating limited relative rotation therebetween; means carried by the other of said structures for engaging said blocking member thereby to move it through the aforesaid limited relative rotation; said blocking member having means carried thereby adapted to block an operation of said sleeve in its shifting out of said neutral position and during asynchronous rotation of said structures which operation is intended to effect engagement of said overrunning clutch and adapted to block an operation of said sleeve in its shifting out of said intermediate position and during asynchronous rotation of said structures which operation is intended to effect establishment of said direct drive.

42. In a motor vehicle drive having a rotatable driving structure adapted to receive drive from the engine and a rotatable driven structure adapted to transmit drive from the driving structure for driving the vehicle, a hub carried by the driven structure; a gear driven by the driving structure; an overrunning clutch operably disposed between said hub and said gear and adapted when engaged to transmit a one-way overrunning drive therebetween; a set of clutch teeth carried by said driving structure; a shiftable sleeve non-rotatably carried by said hub and adapted for shifting into engagement with said clutch teeth for establishing a direct drive between said structures; said overrunning clutch including a control finger operably connected with said sleeve and adapted to disengage said overrunning clutch when said sleeve is in neutral position; means for engaging said overrunning clutch in response to shift of said sleeve to a position intermediate its neutral position and its direct drive position; manually operable means for shifting said sleeve from neutral to intermediate position; power operated means for shifting said sleeve from intermediate to direct drive position; a blocking member disposed between said hub and said clutch teeth, said blocking member having means carried thereby adapted to block an operation of said sleeve in its shifting out of said neutral position and during overrunning of said driven structure by said driving structure which shifting is intended to effect engagement of said overrunning clutch when said structures are stationary or are rotating in synchronism or when said driven structure is overrunning said driving structure.

43. In a motor vehicle drive having a rotatable driving structure adapted to receive drive from the engine and a rotatable driven structure adapted to transmit drive from the driving structure for driving the vehicle, a hub carried by the driven structure; a gear driven by the driving structure; an overrunning clutch operably disposed between said hub and said gear and adapted when engaged to transmit a one-way overrunning drive therebetween; a set of clutch teeth carried by said driving structure; a shiftable sleeve non-rotatably carried by said hub and adapted for shifting into engagement with said clutch teeth for establishing a direct drive between said structures; said overrunning clutch including a control finger operably connected with said sleeve and adapted to disengage said overrunning clutch when said sleeve is in neutral position; means for engaging said overrunning clutch in response to shift of said sleeve to a position intermediate its neutral position and its direct drive position; manually operable means for shifting said sleeve from neutral to intermediate position; power operated means for shifting said sleeve from intermediate to direct drive position; said power operated means including means permitting operation of the power operated means in advance of shift of said sleeve and energy-storing means adapted for energization by operation of said power operated means and operably associated with said sleeve for shifting the same; a blocking member disposed between said hub and said clutch teeth, said blocking member having means carried thereby adapted to block an operation of said sleeve in its shifting out of said neutral position and during overrunning of said driven structure by said driving structure which shifting is intended to effect engagement of said overrunning clutch but accommodating said shift when said structures are stationary or are rotating in synchronism or when said driven structure is overrunning said driving structure.

44. In a power transmission for a vehicle having an engine, a driving structure adapted to be driven by the engine and a driven structure adapted to drive the vehicle, a first means for establishing one speed ratio drive between said structures, a second means for establishing a second different speed ratio drive between said structures, a shift control member carried by one of the structures and adapted for selective shifting to a plurality of positions to establish said speed ratio drives through said transmission; said shift member being adapted for shifting in one direction to a first position to establsh said one speed ratio drive by said first means and for further shifting in the same direction to a second position to establish said different speed ratio drive by said second means; manually operable control means for shifting said control member to establish said one speed ratio drive; power operable control means for shifting said control member to establish said different speed ratio drive.

45. In a power transmission for a vehicle having an engine, a driving structure adapted to be driven by the engine and a driven structure adapted to drive the vehicle, a first means for establishing one speed ratio drive between said structures, a second means for establishing a second different speed ratio drive between said structures, a shift control member carried by one of the structures and adapted for selective shifting to a plurality of positions to establish said speed ratio drives through said transmission; said shift member being adapted for shfting in one direction to a first position to establish said one speed ratio drive to said first means and for further shifting in the same direction to a second position to establish said different speed ratio drive by said second means; manually operable control means for shifting said control member to establish said one speed ratio drive; power operable control means for shifting said control member to establish said different speed ratio drive; a shift yoke operably engaging said member; an actuating element carried by said manually operable means for engaging said yoke thereby to effect shift of said control member, and means for limiting shift of said yoke by said actuating element.

46. In a power transmission for a vehicle having an engine, a driving structure adapted to be driven by the engine and a driven structure adapted to drive the vehicle, a first means for establishing one speed ratio drive between said structures, a second means for establishing a second different speed ratio drive between said structures, a shift control member carried by one of the structures and adapted for selective shifting to a plurality of positions to establish said speed ratio drives through said transmission; said shift member being adapted for shifting in one direction to a first position to establish said one speed ratio drive by said first means and for further shifting in the same direction to a second position to establish different speed ratio drive by said second means; manually operable control means for shifting said control member to establish said one speed ratio drive; power operable control means for shifting said control member to establish said different speed ratio drive; a shift yoke operably engaging said control member; an actuating element carried by said manually operable means for engaging said yoke thereby to effect shift of said control member but accommodating shift of said control member relatively thereto by said power means; means limiting shift of said yoke by said actuating element; the said power operable means being disposed with respect to said yoke such that it is adapted upon operation thereof to shift said yoke relatively to said actuating element.

47. In a power transmission for a vehicle having an engine, a driving structure adapted to be driven by the engine and a driven structure adapted to drive the vehicle, a first means for establishing one speed ratio drive between said structures, a second means for establishing a second different speed ratio drive between said structures, a shift control member carried by one of the structures and adapted for selective shifting to a plurality of positions to establish said speed ratio drives through said transmission; said shift control member being adapted for shifting in one direction to a first position to establish said one speed ratio drive by said first means and for further shifting in the same direction to a second position to establish said different speed ratio drive by said second means; manually operable control means for shifting said control member to establish said one speed ratio drive; power operable control means for shifting said control member to establish said different speed ratio drive; and energy storing means operatively associated with said control member and said power operable means and adapted to permit operation of said power operable means in advance of shift of said control member.

48. In a power transmission for a vehicle having an engine, a driving structure adapted to be driven by the engine and a driven structure adapted to drive the vehicle, a first means for establishing one speed ratio drive between said structures, a second means for establishing a second different speed ratio drive between said structures, a shift control member carried by one of the structures and adapted for selective shifting to a plurality of positions to establish said speed ratio drives through said transmission; said shift control member being adapted for shifting in one direction to a first position to establish said one speed ratio drive by said first means and for further shifting in the same direction to a second position to establish said different speed ratio drive by said second means; manually operable control means for shifting said control member to establish said one speed ratio drive; power operable control means for shifting said control member to establish said different speed ratio drive; a shift yoke operably engaging said control member; an actuating element carried by said manually operable means for engaging said yoke thereby to effect shift of said control member, and means for limiting shift of said yoke by said actuating element; and means operably associated with said manually operable means for rendering said power operable means inoperable except when said manually operable means is in drive establishing position.

49. In a power transmission for a vehicle having an engine, a driving structure adapted to be driven by the engine and a driven structure adapted to drive the vehicle, a first means for establishing one speed ratio drive between said structures, a second means for establishing a second different speed ratio drive between said structures, a shift control member carried by one of the structures and adapted for selective shifting to a plurality of positions to establish said speed ratio drives through said transmission; said shift control member being adapted for shifting in one direction to a first position to establish said one speed ratio drive by said first means and for further shifting in the same direction to a second position to establish said different speed ratio drive by said second means; manually operable control means for shifting said control member to establish said one speed ratio drive; power operable control means for shifting said control member to establish said different speed ratio drive; said last means including a fluid pressure actuated piston and energy storing means operatively associated with said piston and operable to permit shifting movement thereof in advance of said control member.

50. In a power transmission for a vehicle having an engine, a driving structure adapted to be driven by the engine and a driven structure adapted to drive the vehicle, a first means for establishing one speed ratio drive between said structures, a second means for establishing a second different speed ratio drive between said structures, a shift control member carried by one of the structures and adapted for selective shifting to a plurality of positions to establish said speed ratio drives through said transmission; said shift control member being adapted for shifting in one direction to a first position to establish said one speed ratio drive by said first means and for further shifting in the same direction to a second position to establish said different speed ratio drive by said second means; a shift yoke engaging said control member; a manually operable shift member adapted to operably engage said yoke for shifting the same thereby to establish said one speed ratio drive; a power actuated shift member operably associated with said yoke; and a lost motion connection between said yoke and said power actuated member.

51. In a power transmission for a motor vehicle having an engine, change speed means having a driving shaft adapted to be driven by the engine and a driven shaft adapted to drive the vehicle; said change speed means also including a first shift member adapted for shifting to provide a step-up in the speed ratio between said shafts and a second shift member adapted for shifting to provide a further step-up in the speed ratio between said shafts; control means for controlling the shifting of said respective members including a pair of speed responsive devices driven by said driven shaft; said devices being constructed and arranged such that shifting of said first shift member is effected at predetermined vehicle speed and shifting of said second shift member is effected at a relatively higher predetermined speed.

52. In a power transmission for a motor vehicle having an engine, change speed means having a driving shaft adapted to be driven by the engine and a driven shaft adapted to drive the vehicle; said change speed means also including a first shift member adapted for shifting to provide a step-up in the speed ratio between said shafts and a second shift member adapted for shifting to provide a further step-up in the speed ratio between said shafts; electromagnetic means for controlling shifting of said respective members; a pair of vehicle speed responsive devices for controlling operation of said electromagnetic means, said devices being respectively constructed and arranged such that they effect shifting of said first member at predetermined speed and shifting of said second member at relatively higher predetermined speed.

53. In a power transmission for a motor vehicle having an engine, change speed means having a driving shaft adapted to be driven by the engine and a driven shaft adapted to drive the vehicle; said change speed means also including a first shift member adapted for shifting to provide a step-up in the speed ratio between said shafts and a second shift member adapted for shifting to provide a further step-up in the speed ratio between said shafts; control means for controlling the shifting of said respective members including a pair of speed responsive devices driven by said driven shaft; said devices being constructed and arranged such that shift of said first shift member is effected at predetermined vehicle speed and shifting of said second shift member is effected at a relatively higher predetermined speed; and a plurality of control means carried by the vehicle for controlling shifting of said respective members independently of said devices.

54. In a power transmission for a motor vehicle having an engine, change speed means having a driving shaft adapted to be driven by the engine and a driven shaft adapted to drive the vehicle; said change speed means also including a first shift member adapted for shifting to provide a step-up in the speed ratio between said shafts and a second shift member adapted for shifting to provide a further step-up in the speed ratio between said shafts; control means for controlling the shifting of said respective members including a pair of speed responsive devices driven by said driven shaft; said devices being constructed and arranged such that shifting of said first shift member is effected at predetermined vehicle speed and shifting of said second shift member is effected at a relatively higher predetermined speed; and driver operable control means carried by the vehicle and operable at the will of the driver for controlling shifting of said members.

55. In a power transmission for a motor vehicle having an engine, change speed means having a driving shaft adapted to be driven by the engine and a driven shaft adapted to drive the vehicle; said change speed means also including a first shift member adapted for shifting to provide a step-up in the speed ratio between said shafts and a second shift member adapted for shifting to provide a further step-up in the speed ratio between said shafts; control means for controlling the shifting of said respective members including a pair of speed responsive devices driven by said driven shaft; said devices being constructed and arranged such that shifting of said first shift member is effected at predetermined vehicle speed and shifting of said second shift member is effected at a relatively higher predetermined speed; a driver operable throttle control carried by the vehicle; means operable in response to operation of said throttle control to wide-open throttle position for controlling shifting of said first shift member; a driver operable clutch pedal carried by the vehicle; and means operable in response to operation of said clutch pedal for controlling shifting of said second shift member.

56. In a power transmission for a motor vehicle having an engine, change speed means having a driving shaft adapted to be driven by the engine and a driven shaft adapted to drive the vehicle; said change speed means also including a first shift member adapted for shifting to provide a step-up in the speed ratio between said shafts and a second shift member adapted for shifting to provide a further step-up in the speed ratio between said shafts; fluid pressure operated motors operably associated with said respective members for shifting the same; control valves associated with said respective motors; electromagnetically controlled means for effecting operation of said valves; and means for controlling operation of said electromagnetically controlled means including a pair of vehicle speed responsive devices adapted for operation at different vehicle speeds.

57. In a power transmission for a motor vehicle having an engine, change speed means having a driving shaft adapted to be driven by the engine and a driven shaft adapted to drive the vehicle; said change speed means also including a first shift member adapted for shifting to provide a step-up in the speed ratio between said shafts and a second shift member adapted for shifting to provide a further step-up in the speed ratio between said shafts; fluid pressure operated motors operably associated with said respective members for shifting the same; control valves associated with said respective motors; electromagnetically controlled means for effecting operation of said valves; and means for controlling operation of said electromagnetically controlled means including a pair of vehicle speed responsive devices adapted for operation at different vehicle speeds; and a plurality of driver operable control devices carried by said vehicle for controlling said electromagnetically controlled means independently of said speed responsive devices.

58. A variable speed transmission comprising in combination a countershaft type unit having low, second and direct drive ratios, and a planetary type unit having direct drive and overdrive ratios, means for effecting shifts between second and direct drive in the countershaft unit, means for effecting shifts between direct drive and overdrive in the planetary unit, and means for automatically controlling the two said shifting means to effect shifts from second to overdrive second to overdrive direct.

59. A variable speed transmission comprising in combination a countershaft type unit having second and direct drive ratios, and a planetary type unit having direct drive and overdrive ratios, means for effecting shifts between second and direct drive in the countershaft unit, means for effecting shifts between direct drive and overdrive in the planetary unit, and means for automatically controlling the two said shifting means to effect shifts from second direct to second overdrive to direct overdrive.

60. In a control mechanism for a power transmitting device, said device including a driving shaft, a driven shaft, a rotatable element and another element engageable therewith, said elements cooperating to complete a speed ratio change in said device between said shafts, an operator for effecting the engagement of the elements, means operable for biasing the operator to effect the engagement of said elements, means adapted to be acted upon by opposed differential pressures and associated with the operator and said biasing means for energizing said biasing means to effect said engagement and means operable as a function of the operation of the power transmitting device to counteract the effect of said biasing means and to urge said differential pressure means to effect disengagement of the elements, and means operative at a predetermined speed of rotation of one of said shafts for causing said second named means to assist the biasing means to effect an engagement of the elements.

61. In a control mechanism for a power transmitting device, said device including a driving shaft, a driven shaft, a rotatable element and another element engageable therewith, said elements cooperating to complete a speed ratio change in said device between said shafts, an operator for effecting the engagement of the elements, a spring operable for biasing the operator to effect the engagement, means adapted to be acted upon by opposed differential pressures and associated with the operator, and said spring for energizing said spring to effect said engagement and means operable as a function of the operation of the power transmitting device to counteract the effect of said spring and to urge said differential pressure means to effect disengagement of the elements, and means operative at a predetermined speed of rotation of one of said shafts for causing said first-named means to assist the spring to effect an engagement of the elements.

62. In a control mechanism for a power transmitting device, said device including a driving shaft, a driven shaft, a rotatable element and another element engageable therewith, said elements cooperating to complete a speed ratio change in said device between said shafts, an operator for effecting engagement of the elements, means operable for biasing the operator to effect the engagement, a piston associated with the operator, means operative at a predetermined speed of rotation of one of said shafts for introducing fluid under pressure behind the piston to cause the piston to energize said biasing means to effect an engagement of the elements and means operable as a function of release of pressure fluid behind said piston for urging disengagement of said elements.

63. In a control mechanism for a power transmitting device, said device including a driving shaft, a driven shaft, a rotatable element and another element engageable therewith, said elements cooperating to complete a speed ratio change in said device between said shafts, an operator for effecting the engagement of the elements, a piston associated with the operator, spring means for biasing the elements to engaged position, means operative at a predetermined speed of rotation of one of said shafts for causing the piston to energize said spring means to effect an engagement of the elements and means operable as a function of the operation of said piston for urging disengagement of said elements.

64. A combination as described in claim 63, the operator and piston comprising a single unit which is movable as a whole to control the elements there being relative axial movement between said operator and said piston.

65. In a variable speed transmission for driving a motor vehicle having an engine provided with a throttle valve and an accelerator pedal operably connected to said valve for adjustment thereof by the vehicle driver; the combination comprising a countershaft type unit and a planetary type unit in tandem, each of said units providing a first and a second ratio forward, the power flow in forward being from the countershaft unit to the planetary unit, means for effecting shifts from one ratio to another in the countershaft type unit, means for effecting shifts from one ratio to another in the planetary unit, said first ratios of said units being combinable to produce a low transmission speed, said first ratio of the countershaft unit being combinable with said second ratio of the planetary unit to produce an intermediate transmission speed, said second ratio of the countershaft unit being combinable with said first ratio in the planetary unit to produce a higher intermediate transmission speed, said second ratios of the two units being combinable to produce a high transmission speed, means for automatically operating the two said shifting means to effect shifts from the low to the high speed through one of said intermediate speeds, and means operable under control of the accelerator pedal upon predetermined movement of the latter in throttle opening direction to automatically operate one of said shifting means to effect a shift from the high speed to the other of said intermediate speeds.

66. In a power transmission for driving a motor vehicle having an engine and a driving shaft driven by the engine; an intermediate shaft; means including gearing for driving said intermediate shaft from said driving shaft in a plurality of forward speed ratios and in reverse speed ratio; driver operable control means for selecting said speed ratios; a driven shaft adapted to drive the vehicle; means including gearing for driving said driven shaft from said intermediate shaft in a plurality of forward speed ratios; power operated means operable automatically in response to vehicle speed for effecting change in the driving speed ratio between said intermediate and driven shafts; and means operable in response to operation of said control means into reverse speed ratio or into the lowest of said forward speed ratios for rendering said power operated means inoperable.

67. In a power transmission for driving a motor vehicle having an engine and a driving shaft driven by the engine; an intermediate shaft; means including a gearset and manually operable shift lever means for driving said intermediate shaft from said driving shaft in low, intermediate and direct forward speeds and in reverse speed; a driven shaft adapted to drive the vehicle; means including a second gearset connecting said intermediate shaft with said driven shaft and operable to drive the driven shaft at the speed of the intermediate shaft or at a speed different from the speed of the intermediate shaft; power operated drive control means for controlling operation of said second gearset; vehicle speed responsive means for controlling said power operated means; and means operable in response to manipulation of said shift lever means into low or reverse speed position for rendering said speed responsive means inoperable.

68. A transmission comprising input and output shafts, a plurality of gear trains connectible between the shafts to provide a plurality of forward speed ratios, means for establishing said gear trains in said forward speed ratios, and joint means for controlling said ratio establishing means to effect downshifts between the speeds including means controlled by the speed of a member associated with the transmission, manually operable means including a throttle controlling member, and a pair of switches at least one of which is operable by said throttle controlling member, said joint means above a predetermined range of speed of the speed controlled member being operable to effect a double downshift in response to two independent predetermined operations of said manually operable means, one of said pair of switches being operable in response to an operation of part of said manually operable means to initiate the first of said downshifts and the other of said pair of switches being operable in response to an operation of another part of said manually operable means for initiating the second of said downshifts.

69. In a power transmission for driving a motor vehicle having an engine, change speed means having a driving shaft adapted to be driven by the engine and a driven shaft adapted to drive the vehicle, said change speed means also including means for establishing a relatively slow speed ratio drive through said change speed means from the driving shaft to the driven shaft, means for establishing an intermediate speed ratio drive through said change speed means from the driving shaft to said driven shaft, and means for establishing a relatively fast speed ratio drive through said change speed means from the driving shaft to the driven shaft which drive is relatively faster than that provided by either of the aforesaid slow speed ratio or intermediate speed ratio drives, motor means operably associated with said intermediate speed ratio drive establishing means and with said fast speed ratio drive establishing means respectively, means for controlling said motor means including ap air of speed responsive elements one operable for effecting operation of said motor means for said intermediate speed ratio drive establishing means at predetermined vehicle speed for establishing said intermediate speed ratio drive and the other operable for effecting operation of said motor means for said fast speed ratio drive establishing means at or above a relatively higher predetermined vehicle speed for establishing said fast speed ratio drive upon momentary release of the drive through said transmission.

70. In a power transmission for driving a motor vehicle having an engine, change speed means having a driving shaft adapted to be driven by the engine and a driven shaft adapted to drive the vehicle, said change speed means also including means for establishing a relatively slow speed ratio drive through said change speed means from the driving shaft to the driven shaft, means for establishing an intermediate speed ratio drive through said change speed means from the driving shaft to said driven shaft, and means for establishing a relatively fast speed ratio drive through said change speed means from the driving shaft to the driven shaft which drive is relatively faster than that provided by either of the aforesaid slow speed ratio or intermediate speed ratio drives, fluid pressure motors operably associated with said intermediate speed ratio drive establishing means and with said fast speed ratio drive establishing means respectively, speed responsive means for controlling operation of said fluid pressure motors, said speed responsive means being arranged for effecting operation of said motor means for said intermediate speed ratio drive establishing means at predetermined vehicle speed while accelerating the vehicle from rest in said slow speed ratio drive for establishing said intermediate speed ratio drive, and for effecting operation of said motor means for said fast speed ratio drive establishing means at or above a relatively higher predetermined vehicle speed for establishing said fast speed ratio drive and means for limiting establishiment of said fast speed ratio drive to a condition of vehicle coast.

71. In a power transmission for driving a motor vehicle having an engine, change speed means having a driving shaft adapted to be driven by the engine and a driven shaft adapted to drive the vehicle, said change speed means also including means for establishing a relatively slow speed ratio drive through said change speed means from the driving shaft to the driven shaft, means for establishing an intermediate speed ratio drive through said change speed means from the driving shaft to said driven shaft which is a relatively faster drive than said slow speed ratio drive, and means for establishing a relatively fast speed ratio drive through said change speed means from the driving shaft to the driven shaft which drive is relatively faster than that provided by either of the aforesaid slow speed ratio or intermediate speed ratio drives, motor means operably associated with said intermediate speed ratio drive establishing means and with said fast speed ratio drive establishing means respectively, said motor means including a pair of pressure fluid operated motors, a pair of valves operably connected to said motor for controlling operation of the same, electromagnetic means for controlling said valves, and a plurality of control instrumentalities carried on said vehicle for controlling said electromagnetic means.

72. In a power transmission for driving a motor vehicle having an engine, change speed means having a driving shaft adapted to be driven by the engine and a driven shaft adapted to drive the vehicle, said change speed means also including means for establishing relatively slow speed ratio drive through said change speed means from the driving shaft to the driven shaft, means for establishing an intermediate speed ratio drive through said change speed means from the driving shaft to the driven shaft which is a relatively faster drive than said slow speed ratio drive, and means for establishing a relatively fast speed ratio drive through said change speed means from the driving shaft to the driven shaft which drive is relatively faster than that provided by either of the aforesaid slow speed ratio or intermediate speed ratio drives, motor means operably associated with said intermediate speed ratio drive establishing means and with said fast speed ratio drive establishing means respectively, said motor means including a pair of pressure fluid operated motors, a pair of valves operably connected to said motors for controlling operation of the same, electromagnetic means for controlling said valves, a pair of speed responsive switch devices for controlling said electromagnetic means, said devices being constructed and arranged such that said intermediate speed ratio drive is established automatically in response to acceleration of the vehicle above a predetermined speed in said slow speed ratio drive, and said fast speed ratio drive is established in response to momentary release of the driving torque through the transmission during driving of the vehicle in said intermediate speed ratio drive at a relatively faster predetermined speed.

73. In a power transmission for driving a motor vehicle having an engine, change speed means having a driving shaft adapted to be driven by the engine and a driven shaft adapted to drive the vehicle, said change speed means also including means for establishing a relatively slow speed ratio drive through said change speed means from the driving shaft to the driven shaft, means for establishing an intermediate speed ratio drive through said change speed means from the driving shaft to the driven shaft, and means for establishing a relatively fast speed ratio drive through said change speed means from the driving shaft to the driven shaft which drive is relatively faster than that provided by either of the aforesaid slow speed ratio or intermediate speed ratio drives, motor means operably associated with said intermediate speed ratio drive establishing means and with said fast speed ratio drive establishing means respectively, said motor means including a pair of pressure fluid operated motors, a pair of valves operably connected to said motors for controlling operation of the same, electromagnetic means for controlling said valves, a pair of speed responsive switch devices for controlling said electromagnetic means, said devices being constructed and arranged such that said intermediate speed ratio drive is established by said intermediate speed ratio drive establishing means in response to acceleration of the vehicle above a predetermined speed in said slow speed ratio drive, and said fast speed ratio drive is established by said fast speed ratio drive establishing means in response to momentary release of the driving torque during drive of the vehicle in said intermediate speed ratio drive in excess of a relatively faster predetermined speed, a driver operable throttle control element, and means operable in response to operation of said element to wide open throttle position for causing instantaneous re-establishment of said intermediate speed ratio drive during drive in said fast speed ratio drive and instantaneous re-establishment of said slow speed ratio drive during driving in said intermediate speed ratio drive.

74. A variable speed transmission comprising a countershaft type unit and a planetary type unit in tandem, each of said units providing a first and a second ratio, means for effecting shifts from one ratio to another in the countershaft type unit, means for effecting shifts from one ratio to another in the planetary unit, said first ratios of said units being combinable to produce a low transmission speed, said first ratio of the countershaft unit being combinable with said second ratio of the planetary unit to produce an intermediate transmission speed, said second ratio of the countershaft unit being combinable with said first ratio of the planetary unit to produce a higher intermediate transmission speed, said second ratios of the two units being combinable to produce a high transmission speed, and means for automatically operating the two said shifting means to effect shifts from the low speed to the high speed through alternatively either of the intermediate speeds, governor means for controlling the operating means, and manual means for controlling the effectiveness of the governor.

75. In a control mechanism for a power transmitting device, said device including a driving shaft, a driven shaft, a rotatable element and another element engageable therewith, said elements cooperating to complete a speed ratio change in said device between said shafts, means operable for effecting engagement and disengagement of said elements comprising a pair of spring biasing means and means adapted to be acted upon by opposed differential pressures, and means operative at a predetermined speed of rotation of one of said shafts for causing said last named means to energize one of said biasing means to effect an engagement of the elements.

76. In a control mechanism for a power transmitting device, said device including a driving shaft, a driven shaft, a rotatable element and another element engageable therewith, said elements cooperating to complete a speed ratio change in said device between said shafts, an operator for effecting the engagement of the elements, means operable for biasing the operator to effect the engagement including means adapted to be acted upon by opposed differential pressures and associated with the operator, means operable to counteract the effect of said biasing means and operable upon said differential pressure means to effective disengagement of the elements, and means operative at a predetermined speed of rotation of one of said shafts for causing said first named means to energize the biasing means to effect an engagement of the elements.

References Cited in the file of this patent

UNITED STATES PATENTS

| | | |
|---|---|---|
| 1,607,986 | Jones | Nov. 23, 1926 |
| 1,698,031 | Smoot | Jan. 8, 1929 |
| 2,105,429 | Maybach | Jan. 11, 1938 |
| 2,106,870 | Floss | Feb. 1, 1938 |
| 2,110,711 | MacCulloch | Mar. 8, 1938 |
| 2,115,097 | Durham | Apr. 26, 1938 |
| 2,167,846 | Martin | Aug. 1, 1939 |
| 2,180,330 | Hey | Nov. 14, 1939 |
| 2,193,267 | Burtnett | Mar. 12, 1940 |
| 2,223,535 | Sinclair | Dec. 3, 1940 |
| 2,234,003 | Hruska | Mar. 4, 1941 |
| 2,238,746 | Neracher et al. | Apr. 15, 1941 |
| 2,262,747 | Banker | Nov. 18, 1941 |
| 2,342,960 | Neracher et al. | Feb. 29, 1944 |
| 2,349,297 | Neracher et al. | May 23, 1944 |